(12) United States Patent
Lin et al.

(10) Patent No.: US 8,120,836 B2
(45) Date of Patent: Feb. 21, 2012

(54) LUMINANCE ENHANCEMENT STRUCTURE FOR REFLECTIVE DISPLAY DEVICES

(75) Inventors: Craig Lin, San Jose, CA (US); Robert A. Sprague, Saratoga, CA (US)

(73) Assignee: SiPix Imaging, Inc., Fremont, CA (US)

( * ) Notice: Subject to any disclaimer, the term of this patent is extended or adjusted under 35 U.S.C. 154(b) by 0 days.

(21) Appl. No.: 12/719,702

(22) Filed: Mar. 8, 2010

(65) Prior Publication Data

US 2010/0225999 A1    Sep. 9, 2010

Related U.S. Application Data

(60) Provisional application No. 61/158,636, filed on Mar. 9, 2009.

(51) Int. Cl.
*G02B 26/00* (2006.01)
*G02F 1/03* (2006.01)
*G02F 1/29* (2006.01)

(52) U.S. Cl. .......... 359/296; 359/245; 359/316; 345/33; 345/107; 349/139

(58) Field of Classification Search ............... 359/296, 359/245, 253–254, 265, 290–291; 349/33; 345/107; 430/31–32
See application file for complete search history.

(56) References Cited

U.S. PATENT DOCUMENTS

| | | | |
|---|---|---|---|
| 4,083,626 A * | 4/1978 | Miyahara et al. | 359/453 |
| 5,151,801 A | 9/1992 | Hiroshima | |
| 6,144,430 A | 11/2000 | Kuo | |
| 6,277,263 B1 | 8/2001 | Chen | |
| 6,327,013 B1 | 12/2001 | Tombling et al. | |
| 6,556,261 B1 | 4/2003 | Krusius et al. | |
| 6,565,729 B2 | 5/2003 | Chen et al. | |
| 6,753,064 B1 | 6/2004 | Nakama et al. | |
| 6,784,962 B2 | 8/2004 | Sumida et al. | |
| 6,806,995 B2 | 10/2004 | Chung et al. | |
| 6,930,818 B1 | 8/2005 | Liang et al. | |
| 6,997,595 B2 | 2/2006 | Mi et al. | |
| 7,061,569 B2 | 6/2006 | Yun et al. | |
| 7,088,404 B2 | 8/2006 | Otake et al. | |
| 7,160,017 B2 | 1/2007 | Lee et al. | |
| 7,184,188 B2 | 2/2007 | Kamijima | |
| 7,244,476 B2 | 7/2007 | Sumida et al. | |
| 7,248,394 B2 | 7/2007 | Ding et al. | |
| 7,286,197 B2 | 10/2007 | Kwon et al. | |
| 7,294,866 B2 | 11/2007 | Liu | |

(Continued)

FOREIGN PATENT DOCUMENTS

WO    WO 01/67170    9/2001

(Continued)

OTHER PUBLICATIONS

U.S. Appl. No. 12/323,300, filed Nov. 25, 2008, Sprague et al.

(Continued)

*Primary Examiner* — Dawayne A Pinkney
(74) *Attorney, Agent, or Firm* — Perkins Coie LLP

(57) ABSTRACT

The present invention is directed to luminance enhancement structures for reflective display devices. The structure comprises columns and grooves, wherein each of said grooves has a cross-section comprising an apex angle and two edge lines. The structure increases the overall reflectance by reducing the total internal reflection, and as a result, the brightness of a display device is increased.

16 Claims, 20 Drawing Sheets

U.S. PATENT DOCUMENTS

| | | | |
|---|---|---|---|
| 7,332,066 | B2 | 2/2008 | Chen et al. |
| 7,339,716 | B2 | 3/2008 | Ding et al. |
| 7,342,556 | B2 | 3/2008 | Oue et al. |
| 7,397,619 | B2 | 7/2008 | Hwang et al. |
| 7,408,696 | B2 | 8/2008 | Liang et al. |
| 7,463,317 | B2 | 12/2008 | Takizawa et al. |
| 7,564,519 | B2 | 7/2009 | Takizawa |
| 7,576,914 | B2 | 8/2009 | Goto |
| 7,612,846 | B2 | 11/2009 | Takizawa et al. |
| 7,638,808 | B2 | 12/2009 | Owen et al. |
| 7,667,785 | B2 | 2/2010 | Van Gorkom et al. |
| 7,693,389 | B2 | 4/2010 | Kamijima |
| 7,830,592 | B1 * | 11/2010 | Sprague et al. ............... 359/296 |
| 2001/0006409 | A1 | 7/2001 | Lee |
| 2001/0026347 | A1 | 10/2001 | Sawasaki et al. |
| 2002/0033927 | A1 | 3/2002 | Mun et al. |
| 2002/0057413 | A1 | 5/2002 | Sumida et al. |
| 2003/0165016 | A1 * | 9/2003 | Whitehead et al. ........... 359/627 |
| 2003/0234900 | A1 | 12/2003 | Kim |
| 2005/0003108 | A1 | 1/2005 | Sumida et al. |
| 2005/0041311 | A1 | 2/2005 | Mi et al. |
| 2006/0103779 | A1 | 5/2006 | Amemiya et al. |
| 2007/0152592 | A1 * | 7/2007 | Kim et al. ..................... 313/586 |
| 2007/0200975 | A1 | 8/2007 | Kamijima |
| 2007/0253072 | A1 | 11/2007 | Mullen et al. |
| 2008/0012034 | A1 | 1/2008 | Thielen et al. |
| 2009/0231245 | A1 | 9/2009 | Lin |
| 2010/0141573 | A1 * | 6/2010 | Lin .............................. 345/107 |
| 2010/0177396 | A1 | 7/2010 | Lin |
| 2010/0182351 | A1 | 7/2010 | Lin |
| 2010/0271407 | A1 | 10/2010 | Ho et al. |
| 2011/0043894 | A1 | 2/2011 | Sprague et al. |
| 2011/0057927 | A1 | 3/2011 | Lin |

FOREIGN PATENT DOCUMENTS

| | | |
|---|---|---|
| WO | WO 2008-122927 | 10/2008 |
| WO | WO 2009/114361 | 9/2009 |

OTHER PUBLICATIONS

Allen, K. (Oct. 2003). Electrophoretics Fulfilled. *Emerging Displays Review: Emerging Display Technologies, Monthly Report*—Oct. 2003, 9-14.

Bardsley, J.N. & Pinnel, M.R. (Nov. 2004) Microcup™ Electrophoretic Displays. *USDC Flexible Display Report*, 3.1.2. pp. 3-12-3-16.

Chaug, Y.S., Haubrich, J.E., Sereda, M. and Liang, R.C. (Apr. 2004). Roll-to-Roll Processes for the Manufacturing of Patterned Conductive Electrodes on Flexible Substrates. *Mat. Res. Soc. Symp. Proc.*, vol. 814, I9.6.1.

Chen, S.M. (Jul. 2003) The Applications for the Revolutionary Electronic Paper Technology. *OPTO News & Letters*, 102, 37-41. (in Chinese, English abstract attached).

Chen, S.M. (May 2003) The New Application and the Dynamics of Companies. *TRI*. 1-10. (In Chinese, English abstract attached).

Chung, J., Hou, J., Wang, W., Chu, L.Y., Yao, W., & Liang, R.C. (Dec. 2003). Microcup® Electrophoretic Displays, Grayscale and Color Rendition. *IDW*, AMD2/EP1-2, 243-246.

Ho, Andrew. (Nov. 2006) *Embedding e-Paper in Smart Cards, Pricing Labels & Indicators*. Presentation conducted at Smart Paper Conference Nov. 15-16, 2006, Atlanta, GA, USA.

Ho, C.,& Liang, R.C. (Dec. 2003). *Microcup® Electronic Paper by Roll-to-Roll Manufacturing Processes*. Presentation conducted at FEG, Nei-Li, Taiwan.

Ho, Candice. (Feb. 1, 2005) *Microcupt® Electronic Paper Device and Applicaiton*. Presentation conducted at USDC 4th Annual Flexible Display Conference 2005.

Hou, J., Chen, Y., Li, Y., Weng, X., Li, H. and Pereira, C. (May 2004). Reliability and Performance of Flexible Electrophoretic Displays by Roll-to-Roll Manufacturing Processes. *SID Digest*, 32.3, 1066-1069.

Kao, WC., (Feb. 2009) Configurable Timing Controller Design for Active Matrix Electrophoretic Dispaly. *IEEE Transactions on Consumer Electronics*, 2009, vol. 55, Issue 1, pp. 1-5.

Kao, WC., Fang, CY., Chen, YY., Shen, MH., and Wong, J. (Jan. 2008) Integrating Flexible Electrophoretic Display and One-Time Password Generator in Smart Cards. *ICCE 2008 Digest of Technical Papers*, P4-3. (Int'l Conference on Consumer Electronics, Jan. 9-13, 2008).

Kao, WC., Ye, JA., and Lin, C. (Jan. 2009) Image Quality Improvement for Electrophoretic Displays by Combining Contrast Enhancement and Halftoning Techniques. *ICCE 2009 Digest of Technical Papers*, 11.2-2.

Kao, WC., Ye, JA., Chu, MI., and Su, CY. (Feb. 2009) Image Quality Improvement for Electrophoretic Displays by Combining Contrast Enhancement and Halftoning Techniques. *IEEE Transactions on Consumer Electronics*, 2009, vol. 55, Issue 1, pp. 15-19.

Kao, WC., Ye, JA., Lin, FS., Lin, C., and Sprague, R. (Jan. 2009) Configurable Timing Controller Design for Active Matrix Electrophoretic Display with 16 Gray Levels. *ICCE 2009 Digest of Technical Papers*, 10.2-2.

Lee, H., & Liang, R.C. (Jun. 2003) SiPix Microcup® Electronic Paper—An Introduction. *Advanced Display*, Issue 37, 4-9 (in Chinese, English abstract attached).

Liang, R.C. (Feb. 2003) *Microcup® Electrophoretic and Liquid Crystal Displays by Roll-to-Roll Manufacturing Processes*. Presentation conducted at the Flexible Microelectronics & Displays Conference of U.S. Display Consortium, Phoenix, Arizona, USA.

Liang, R.C. (Apr. 2004). *Microcup Electronic Paper by Roll-to-Roll Manufacturing Process*. Presentation at the Flexible Displays & Electronics 2004 of Intertech, San Fransisco, California, USA.

Liang, R.C. (Oct. 2004) *Flexible and Roll-able Displays/Electronic Paper—A Technology Overview*. Paper presented at the METS 2004 Conference in Taipie, Taiwan.

Liang, R.C., & Tseng, S. (Feb. 2003). *Microcup® LCD, A New Type of Dispersed LCD by a Roll-to-Roll Manufacturing Process*. Paper presented at the IDMC, Taipei, Taiwan.

Liang, R.C., (Feb. 2005) *Flexible and Roll-able Displays/Electronic Paper—A Brief Technology Overview*. Flexible Display Forum, 2005, Taiwan.

Liang, R.C., Hou, J., & Zang, H.M. (Dec. 2002) Microcup Electrophoretic Displays by Roll-to-Roll Manufacturing Processes. *IDW*, EP2-2, 1337-1340.

Liang, R.C., Hou, J., Chung, J., Wang, X., Pereira, C., & Chen, Y. (May 2003). Microcup® Active and Passive Matrix Electrophoretic Displays by a Roll-to-Roll Manufacturing Processes. *SID Digest*, vol. 34, Issue 1, pp. 838-841, 20.1.

Liang, R.C., Hou, J., Zang, H.M., & Chung, J. (Feb. 2003). *Passive Matrix Microcup® Electrophoretic Displays*. Paper presented at the IDMC, Taipei, Taiwan.

Liang, R.C., Hou, J., Zang, H.M., Chung, J., & Tseng, S. (2003). Microcup® displays : Electronic Paper by Roll-to-Roll Manufacturing Processes. *Journal of the SID*, 11(4), 621-628.

Liang, R.C., Zang, H.M., Wang, X., Chung, J. & Lee, H., (Jun./Jul. 2004) << Format Flexible Microcup® Electronic Paper by Roll-to-Roll Manufacturing Process >>, Presentation conducted at the 14th FPD Manufacturing Technology EXPO & Conference.

Nikkei Microdevices. (Dec. 2002) Newly-Developed Color Electronic Paper Promises—Unbeatable Production Efficiency. *Nikkei Microdevices*, p. 3. (in Japanese, with English translation).

Sprague, R.A. (Sep. 23, 2009) SiPix Microcup Electrophoretic Epaper for Ebooks. *NIP 25 Technical Programs and Proceedings*, 2009 pp. 460-462.

Wang, X., Kiluk, S., Chang, C., & Liang, R.C. (Feb. 2004). Mirocup® Electronic Paper and the Converting Processes. *ASID*, 10.1.2-26, 396-399, Nanjing, China.

Wang, X., Kiluk, S., Chang, C., & Liang, R.C., (Jun. 2004) Microcup® Electronic Paper and the Converting Processes. *Advanced Display*, Issue 43, 48-51 (in Chinese, with English abstract).

Wang, X., Li, P., Sodhi, D., Xu, T. and Bruner, S. et al., (Feb. 2006) *Inkjet Fabrication of Multi-Color Microcup® Electrophorectic Display*. The Flexible Microelectronics & Displays Conference of U.S. Display Consortium.

Wang, X., Zang, HM., and Li, P. (Jun. 2006) Roll-to-Roll Manufacturing Process for Full Color Electrophoretic film. *SID Digest*, 00pp. 1587-1589.

Zang, H.M, Hwang, J.J., Gu, H., Hou, J., Weng, X., Chen, Y., et al. (Jan. 2004). Threshold and Grayscale Stability of Microcup® Electronic Paper. *Proceeding of SPIE—IS&T Electronic Imaging, SPIE* vol. 5289, 102-108.

Zang, H.M. & Hou, Jack, (Feb. 2005) *Flexible Microcup® EPD by RTR Process*. Presentation conducted at 2$^{nd}$ Annual Paper-Like Displays Conference, Feb. 9-11, 2005, St. Pete Beach, Florida.

Zang, H.M. (Oct. 2003). *Microcup ® Electronic Paper by Roll-to-Roll Manufacturing Processes*. Presentation conducted at the Advisory Board Meeting, Bowling Green State University, Ohio, USA.

Zang, H.M. (Feb. 2004). *Microcup Electronic Paper*. Presentation conducted at the Displays & Microelectronics Conference of U.S. Display Consortium, Phoenix, Arizona, USA.

Zang, H.M., & Liang, R.C. (2003) Microcup Electronic Paper by Roll-to-Roll Manufacturing Processes. *The Spectrum*, 16(2), 16-21.

Zang, HM., (Feb. 2007) *Developments in Microcup® Flexible Displays*. Presentation conducted at the 6th Annual Flexible Display and Microelectronics Conference, Phoenix, AZ Feb. 6-8.

Zang, HM., (Sep. 2006) *Monochrome and Area Color Microcup®EPDs by Roll-to-Roll Manufacturing Process*. Presentation conducted at the Forth Organic Electronics Conference and Exhibition (OEC-06), Sep. 25-27, 2006, Frankfurt, Germany.

Zang, HM., Wang, F., Kang, Y.M., Chen, Y., and Lin, W. (Jul. 2007) *Microcup® e-Paper for Embedded and Flexible Designs*. IDMC'07, Taipei International Convention Center, Taiwan.

Zang, HM., Wang, W., Sun, C., Gu, H., and Chen, Y. (May 2006) Monochrome and Area Color Microcup® EPDs by Roll-to-Roll Manufacturing Processes. *ICIS '06 International Congress of Imaging Science Final Program and Proceedings*, pp. 362-365.

U.S. Appl. No. 12/837,350, filed Jul. 15, 2010, Sprague et al.

U.S. Appl. No. 12/843,396, filed Jul. 26, 2010, Sprague et al.

\* cited by examiner

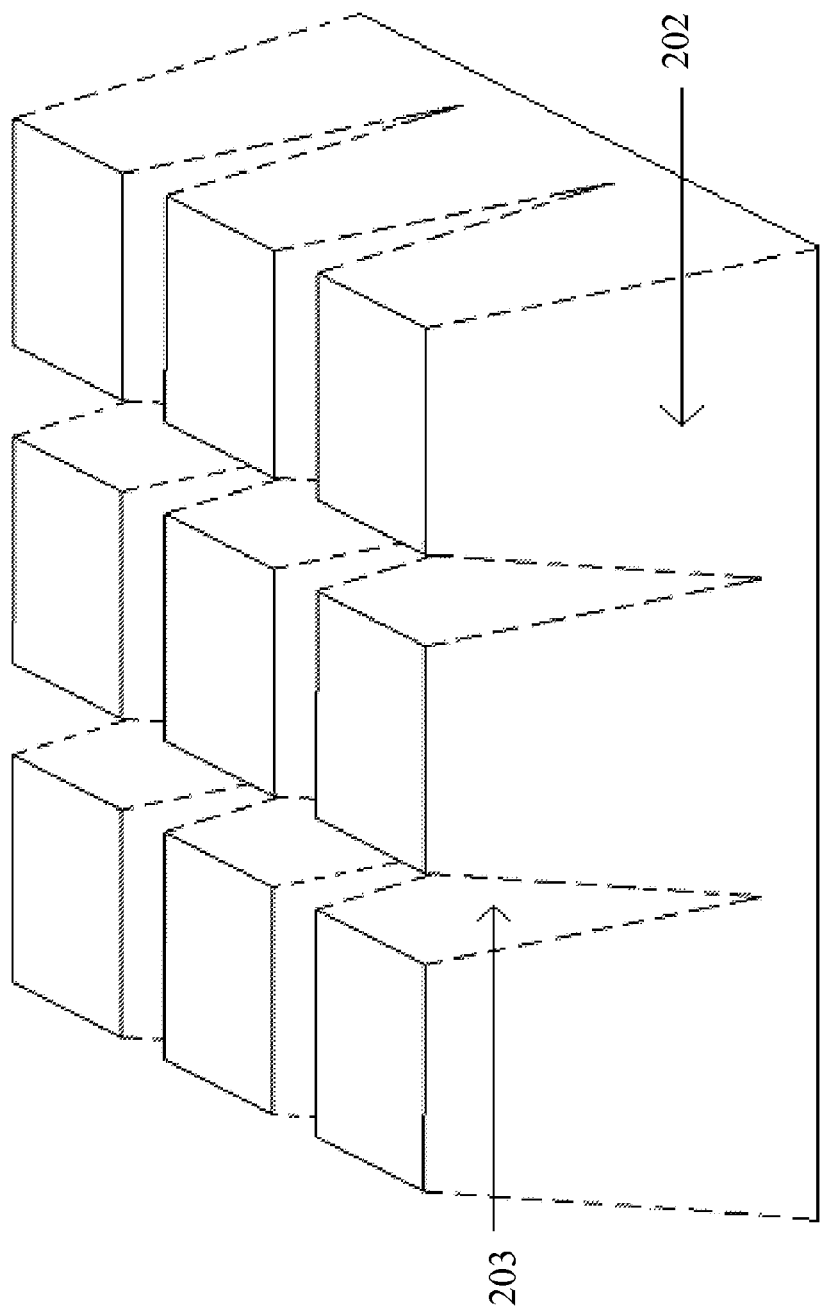

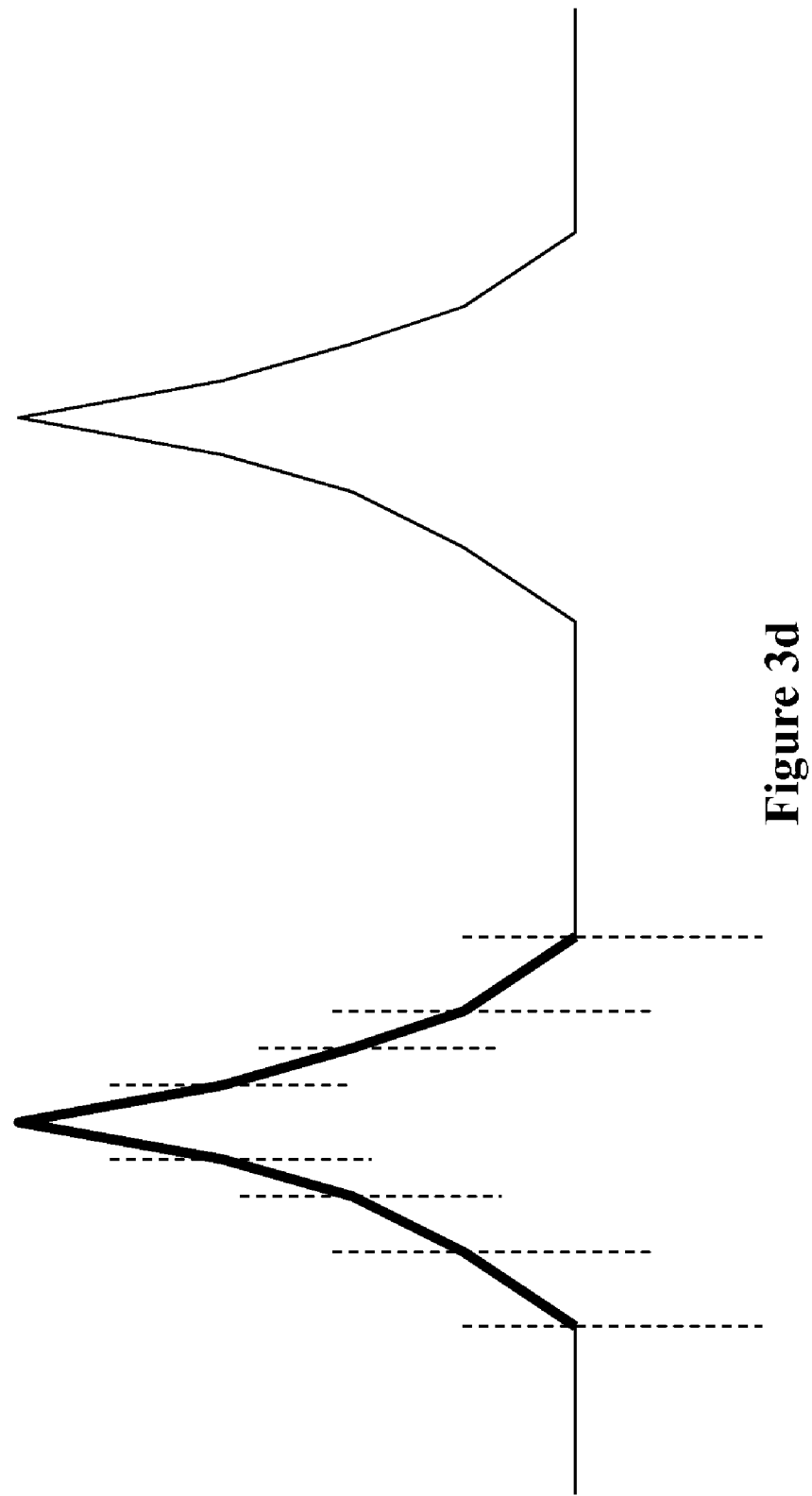

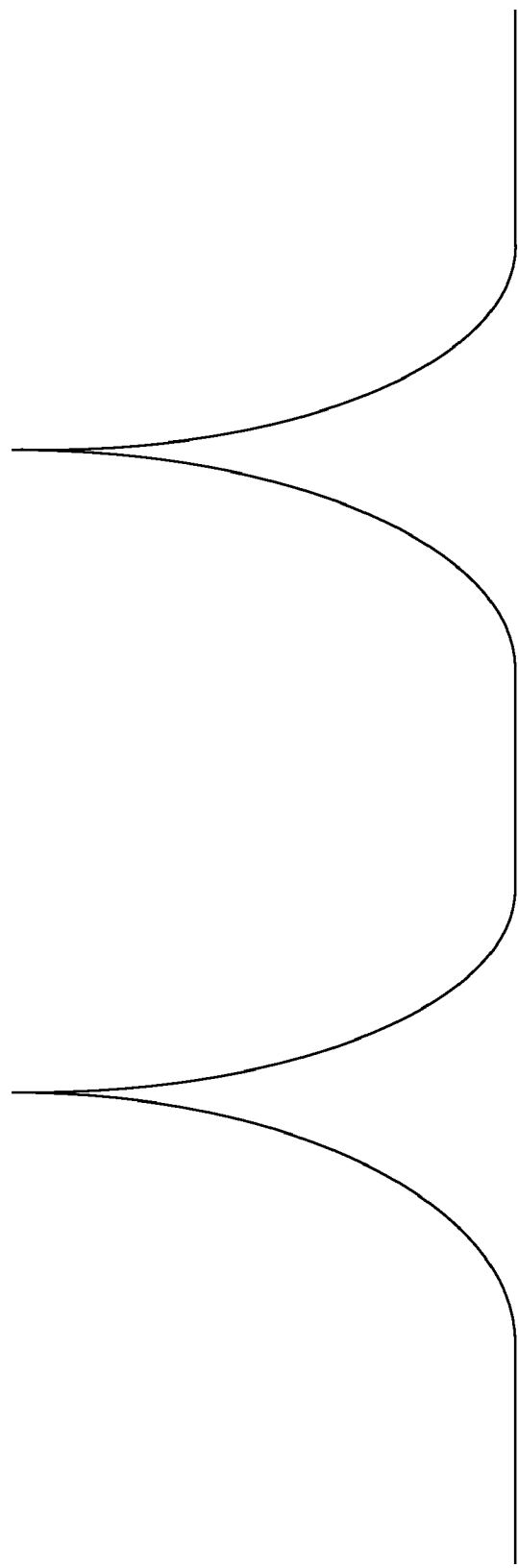

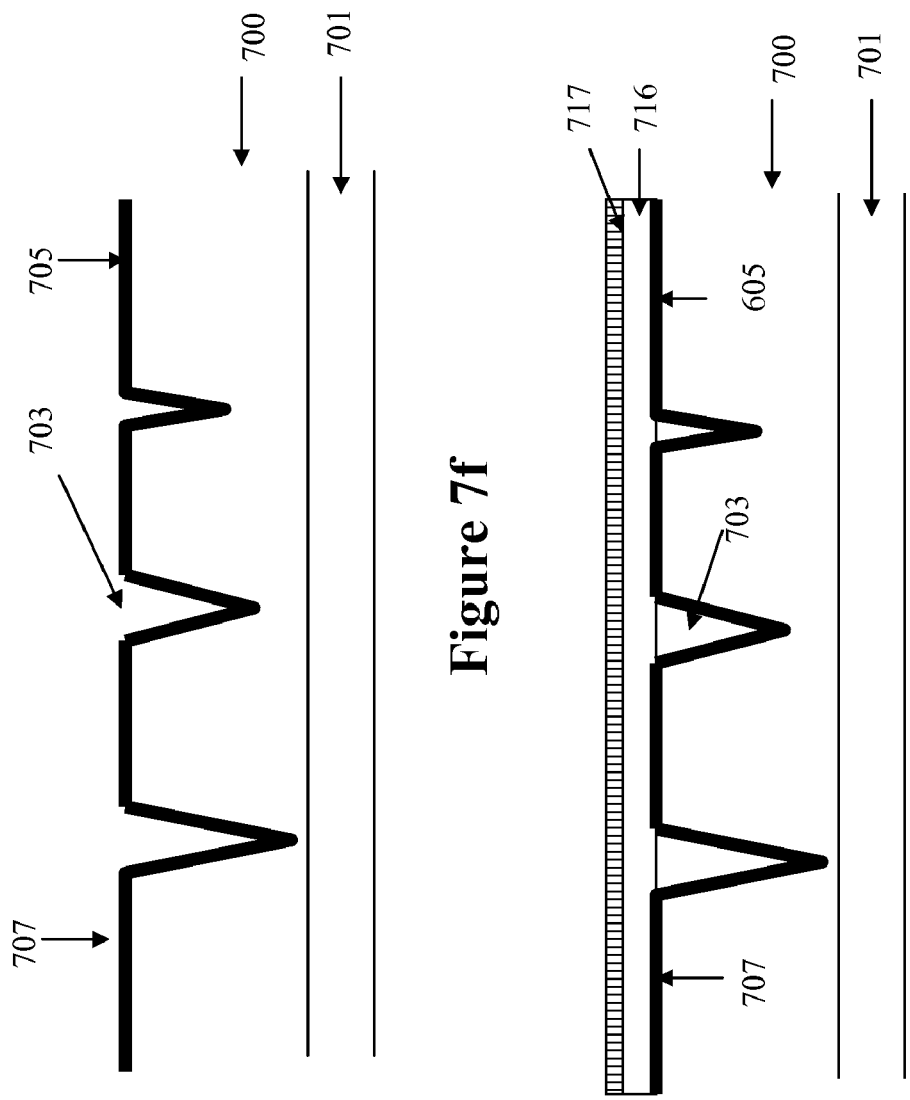

LUMINANCE ENHANCEMENT STRUCTURE FOR REFLECTIVE DISPLAY DEVICES

This application claims priority to U.S. Provisional Application No. 61/158,636, filed Mar. 9, 2009; the content of which is incorporated herein by reference in its entirety.

FIELD OF THE INVENTION

The present invention is directed to a luminance enhancement structure for reflective display devices.

BACKGROUND OF THE INVENTION

The lack of satisfactory brightness is often a concern for electrophoretic display devices. Total internal reflection inevitably would occur with electrophoretic display devices because such a display device usually has components of a high refractive index. Due to the component having a higher refractive index (e.g., about 1.5) than the air (which has a refractive index of about 1) surrounding the display panel, some of the scattering light from the display panel may reflect back to the display device by total internal reflection. This total internal reflection phenomenon may result in a loss of about 30-50% of the scattering light, thus causing reduction in brightness of the display device.

SUMMARY OF THE INVENTION

The first aspect of the invention is directed to a luminance enhancement structure which comprises columns and grooves, wherein each of said grooves has a cross-section comprising an apex angle and two edge lines.

In this aspect of the invention, the luminance enhancement structure may have a one dimensional configuration or a two dimensional configuration.

In one embodiment, the two edge lines are straight lines and the apex angles of the grooves are not the same throughout the structure. The two edge lines of the cross-section may be substantially equal for all grooves, or the two edge lines may be substantially equal for some of the grooves and the two edge lines are not equal for the remaining grooves, or the two edge lines are not equal for all grooves.

In the first aspect of the invention, the heights of the grooves may be substantially equal throughout the structure or the heights of the grooves may vary.

In the first aspect of the invention, the pitches of the grooves may be substantially equal for all grooves throughout the structure or the pitches of the grooves may vary.

In the first aspect of the invention, each of the two edge lines may comprise two or more segments of straight line and the different segments of the straight line have different edge line angles. In this embodiment, the apex angles of the grooves are substantially equal for all grooves throughout the structure. The edge lines may appear curved. The curved edge lines may have more than one curvature.

In one embodiment, the two edge lines of a single groove have different numbers of segments of the straight line.

The apex angle may be in the range of about 5° to about 50°, preferably in the range of about 20° to about 40°.

In one embodiment, the surface of the grooves is not coated.

The second aspect of the invention is directed to a display device assembly comprising
 a) a display panel which comprises an array of display cells filled with a display fluid; and
 b) a luminance enhancement structure on the viewing side of the display device, wherein said luminance structure comprises columns and grooves, wherein each of said grooves has a cross-section comprising an apex angle and two edge lines.

In the assembly, the luminance enhancement structure may have a one dimensional configuration or a two dimensional configuration.

In the assembly, the two edge lines are straight lines and the apex angles of the grooves are not the same throughout the structure.

In the assembly, each of the two edge lines may comprise two or more segments of straight line and the different segments of the straight line have different edge line angles. In this embodiment, the apex angles of the grooves are substantially equal for all grooves throughout the structure.

In the assembly, the edge lines may appear curved. In this embodiment, the curved edge lines may have more than one curvature.

In the assembly, the two edge lines of a single groove may have different numbers of segments of the straight line.

In the assembly, the apex angle is in the range of about 5° to about 50°, preferably in the range of about 20° to about 40°.

In the assembly, the surface of the grooves is not coated.

The assembly may further comprise a common electrode layer and a backplane.

The luminance enhancement structure increases the overall reflectance by reducing the total internal reflection. As a result, the brightness of a display device is increased. Furthermore, the structure can be fabricated by a cost effective roll-to-roll manufacturing process.

BRIEF DISCUSSION OF THE DRAWINGS

FIGS. 2b and 2c are a three-dimensional view of the luminance enhancement structure.

FIG. 3c-3i depict the second aspect of the present invention.

FIGS. 7a-7g show an example of how the luminance enhancement structure is fabricated.

DETAILED DESCRIPTION OF THE INVENTION

I. Definitions

The technical term "total internal reflection" used in this application refers to an optical phenomenon that occurs when a ray of light strikes a medium boundary at an angle larger than the critical angle (defined below) with respect to the normal axis to the surface. This can only occur where light travels from a medium with a higher refractive index to one with a lower refractive index.

Generally speaking, when a ray of light crosses a boundary between materials with different refractive indices, the light will be partially refracted at the boundary surface, and partially reflected. However, if the angle of incidence is greater than the critical angle, the light will stop crossing the boundary and instead be totally reflected back.

The critical angle is calculated based on the equation of Snell's law: $C=\sin^{-1}(n2/n1)$ wherein n1 and n2 are the refractive indices of the two different media, with n1 being the higher refractive index and n2 being the lower refractive index.

II. Display Devices

Figure 1:
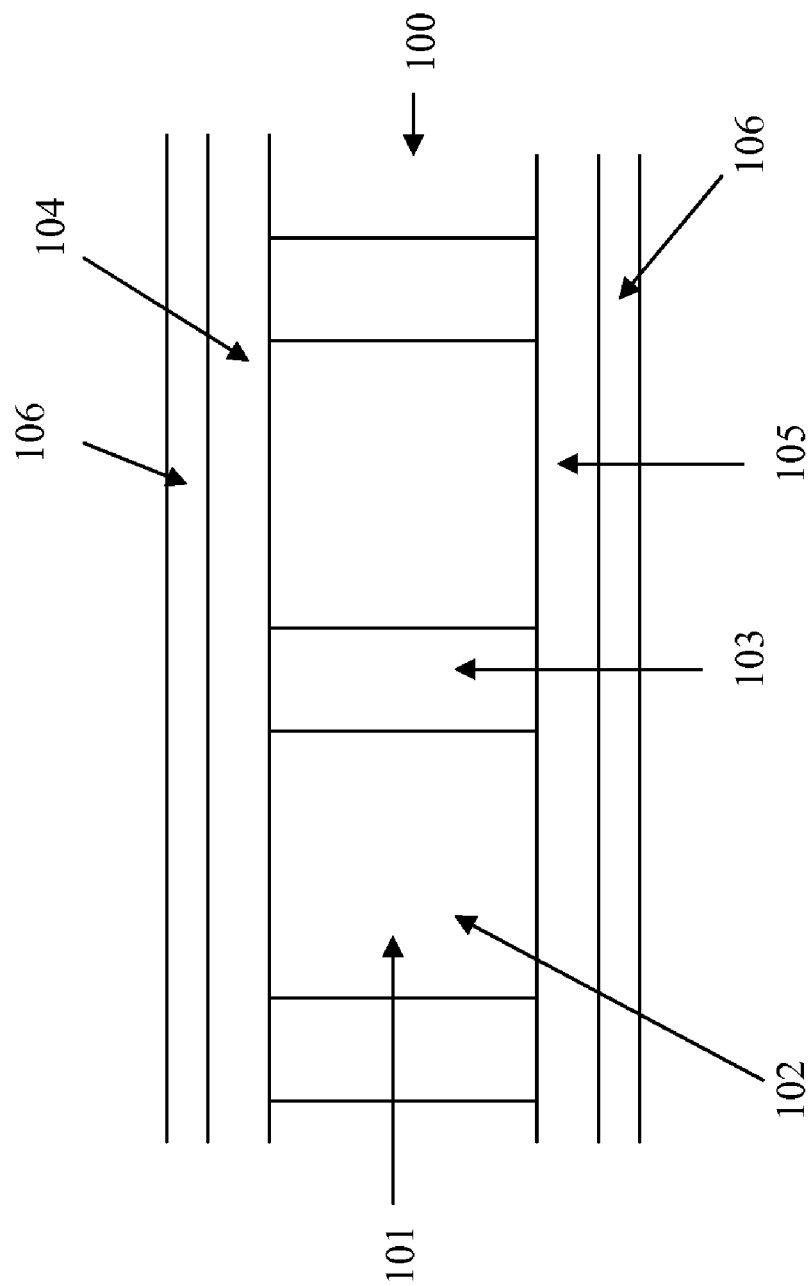
FIG. 1 depicts a cross-section view of a display device.

FIG. 1 illustrates a display device (100). The device comprises an array of display cells (101) which are filled with a display fluid (102) and sandwiched between two electrode layers (104 and 105). Each of the display cells is surrounded by partition walls (103).

For an electrophoretic display, the display cells are filled with an electrophoretic fluid which comprises charged pigment particles dispersed in a solvent. The display fluid may be a system comprising one or two types of particles.

In the system comprising only one type of particles, the charged pigment particles are dispersed in a solvent of a contrasting color. The charged particles will be drawn to one of the electrode layers (104 or 105), depending on the potential difference of the two electrode layers, thus causing the display panel to show either the color of the particles or the color of the solvent, on the viewing side.

In a system comprising particles carrying opposite charges and of two contrasting colors, the particles would move to one electrode layer or the other, based on the charge that they carry and the potential difference of the two electrode layers, causing the display panel to show the two contrasting colors, on the viewing side. In this case, the particles may be dispersed in a clear solvent.

The display cells may also be filled with a liquid crystal composition. In addition, it is understood that the present invention is applicable to all types of reflective display devices.

For a segment display device, the two electrode layers (104 and 105) are one common electrode (e.g., ITO) and one patterned segment electrode layer, respectively. For an active matrix display device, the two electrode layers (104 and 105) are one common electrode and an array of thin film transistor pixel electrodes, respectively. For a passive matrix display device, the two electrode layers (104 and 105) are two line-patterned electrode layers.

The patterned segment electrode layer (in a segment display device) or the thin film transistor pixel electrodes (in an active matrix display device) may be referred to as a "backplane", which along with the common electrode drives the display device.

The electrode layers are usually formed on a substrate layer (106) [(such as polyethylene terephthalate (PET)). The substrate layer may also be a glass layer.

For a microcup-based display device disclosed in U.S. Pat. No. 6,930,818, the content of which is incorporated herein by reference in its entirety, the filled display cells are sealed with a polymeric sealing layer. Such a display device may be viewed from the sealing layer side or the side opposite the sealing layer side, depending on the transparency of the materials used and the application.

III. The Luminance Enhancement Structure

Figure 2A:
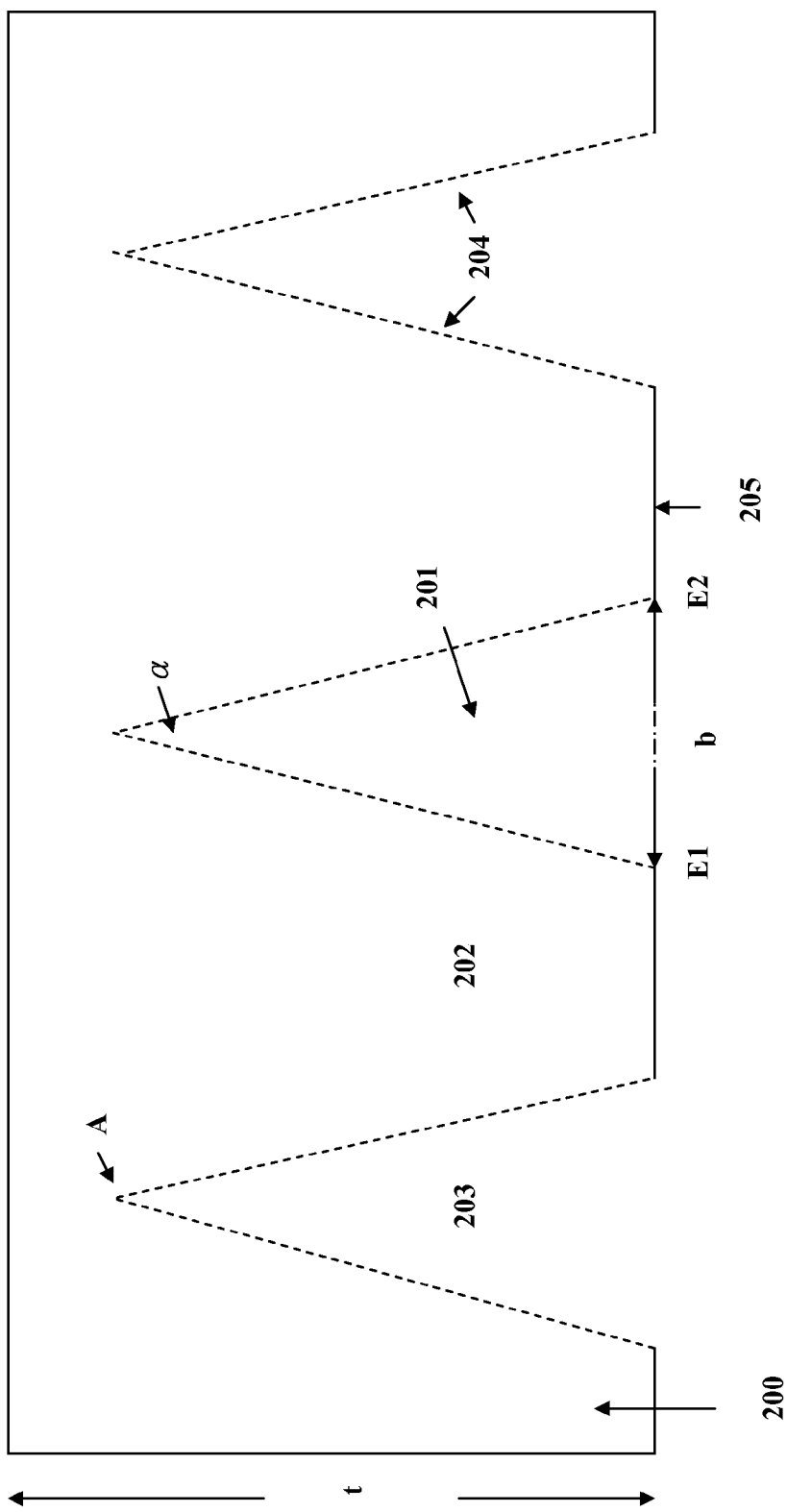
FIG. 2a is a cross-section view of a luminance enhancement structure of the present invention.

FIG. 2a is a cross-section view of the luminance enhancement structure (200) of the present invention in general. There are multiple columns (202) and grooves (203) across the structure. The cross-section (201) of the grooves (203) has a top point A and a base line (b). The dotted lines connecting the top point A to the two ends (E1 and E2) of the base line are referred to as "edge lines". The dotted line means that the edge line may be a straight line or may comprise two or more segments of straight line.

The two edge lines in a groove form an apex angle α. The surface (204) of the grooves (203) is optically flat or may be coated with a metal layer.

In the context of this application, the terms "groove" or "grooves" refers to the groove or grooves the surface of which is either uncoated or coated. In one embodiment of the present invention, the surface of the groove or grooves is preferably uncoated.

The columns (202) have a top surface (205). The thickness ("t") of the luminance enhancement structure may be in the range of about 10 μm to about 200 μm.

The luminance enhancement structure is formed from a material having a refractive index of about 1.4 to 1.7. The luminance enhancement structure is transparent.

The fabrication of such a luminance enhancement structure is illustrated in a section below.

Figure 2B:
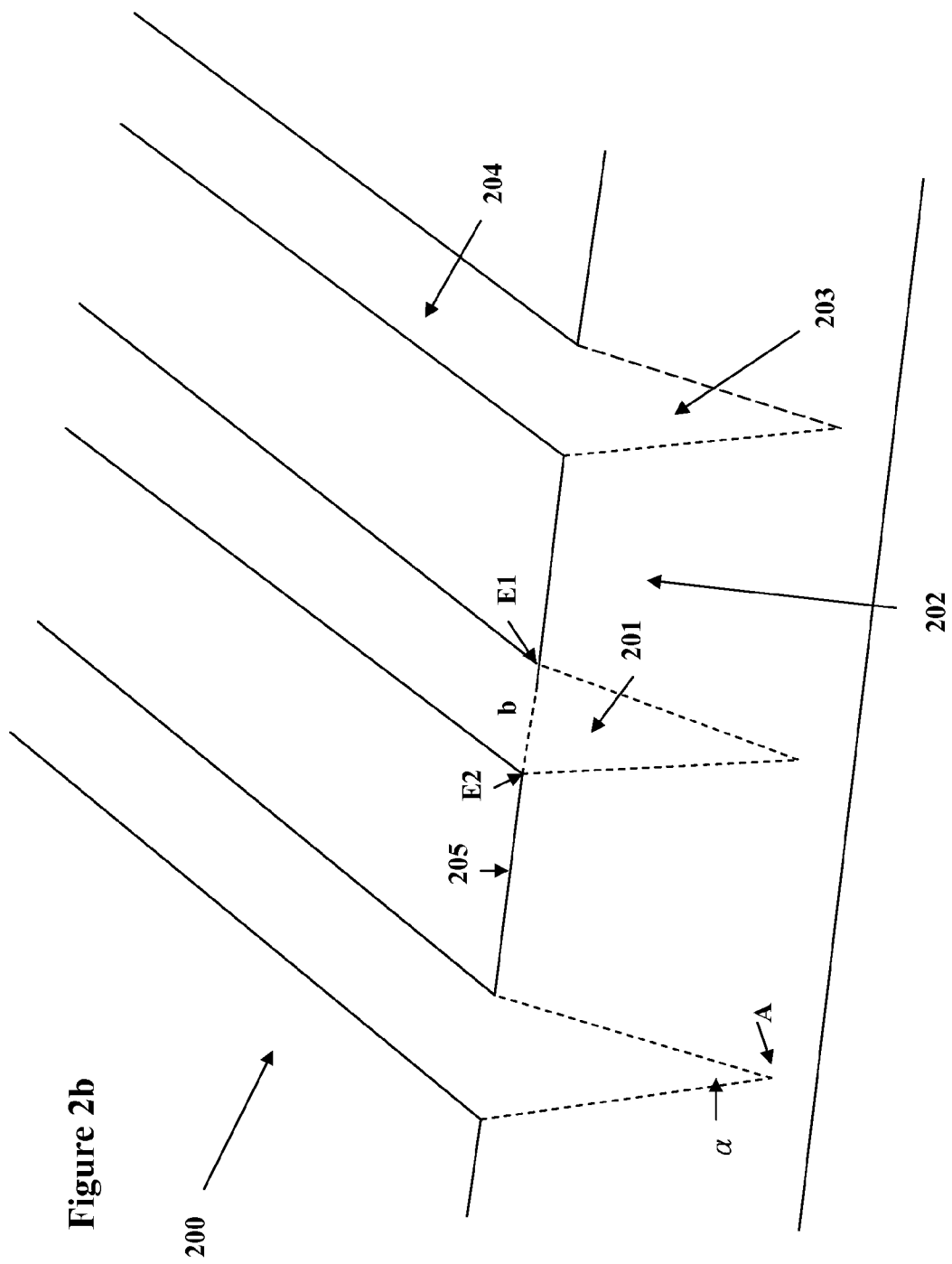

FIG. 2b is a three-dimensional view of the luminance enhancement structure (200) in a one-dimensional configuration (i.e., the columns and grooves are in alternating order and are in continuous form in one direction). FIG. 2c is a three-dimensional view of the luminance enhancement structure (200) in a two dimensional configuration.

Figure 3A:
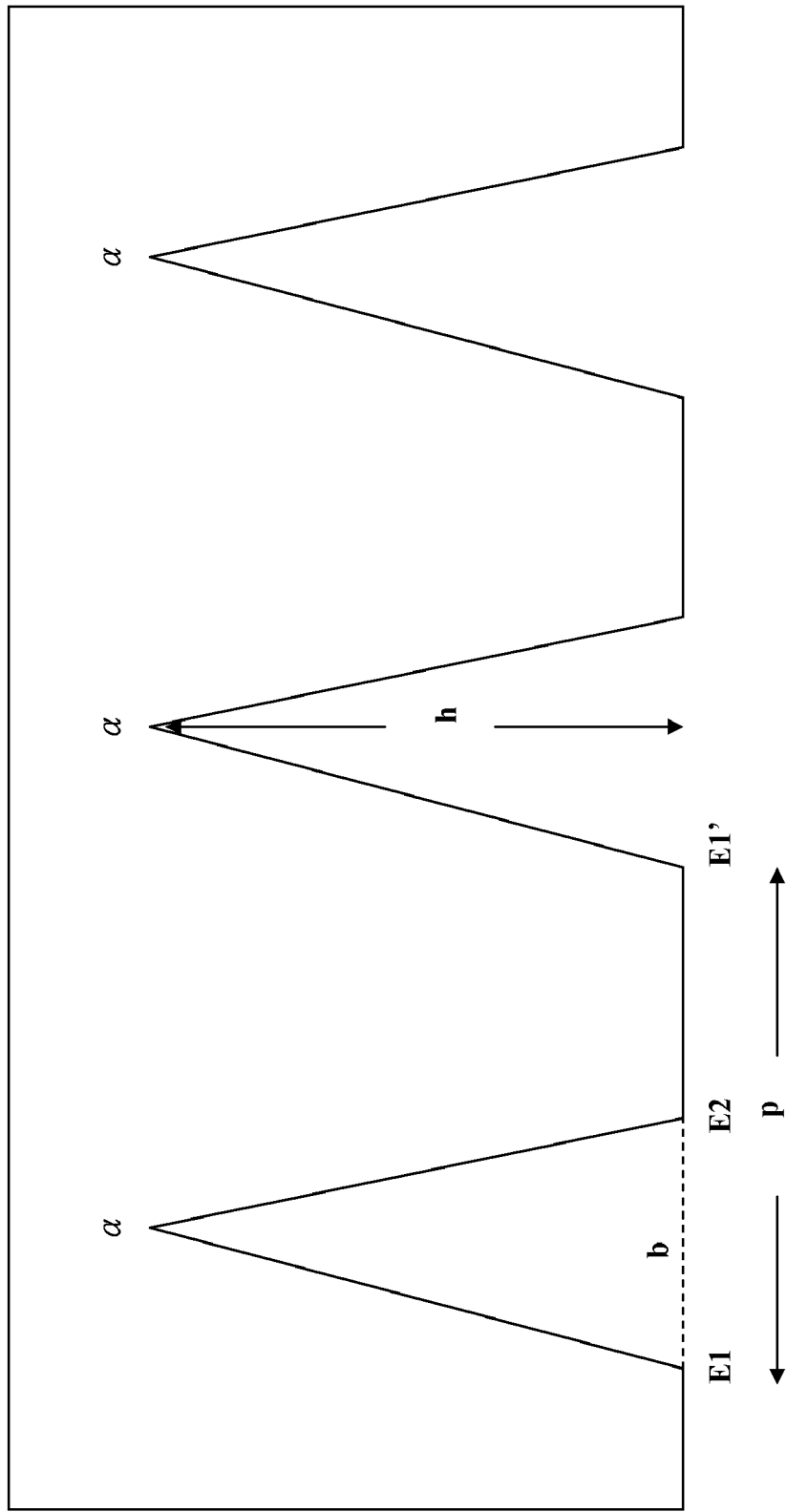
FIG. 3a depicts a luminance enhancement structure having apex angles of substantially the same size.

FIG. 3a shows a luminance enhancement structure wherein the grooves have two edge lines which are straight lines and the apex angles (α) are substantially equal for all grooves throughout the structure.

In one embodiment, the two edge lines of the cross-section are substantially equal (i.e., isosceles triangular cross-section) for all grooves. In another embodiment, the two edge lines are substantially equal for some of the grooves and the two edge lines are not equal for the remaining grooves. In a further embodiment, the two edge lines are different for all grooves.

In one embodiment, the heights "h" of the grooves are substantially equal throughout the structure. In another embodiment, the heights of the grooves vary.

In one embodiment, the pitches ("p") of the grooves are substantially equal for all grooves throughout the structure. In another embodiment, the pitches "p" of the grooves vary. The term "pitch" is defined as the distance between one end point (E1) of the base line (b) of one groove and the corresponding point (E1') of the next groove. In other words, the term "pitch" is the sum of the width of the base line (b) and the width of the top surface of a column between the two grooves.

Figure 3B:
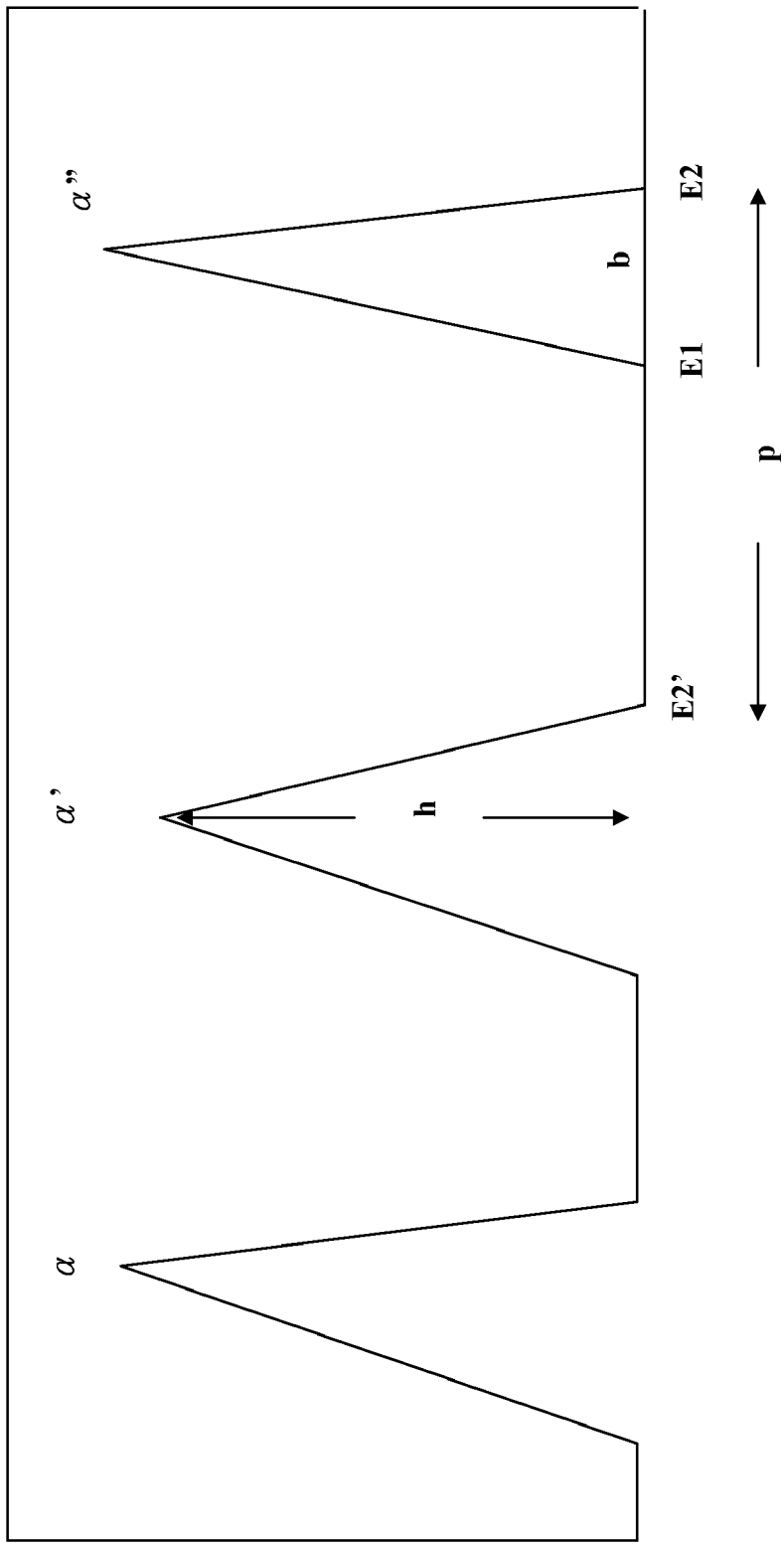
FIG. 3b depicts the first aspect of the present invention.

In the first aspect of the invention as shown in FIG. 3b, the two edge lines are straight lines and the apex angles α, however, are not all equal for the grooves. For example, there may be 70% of the apex angles are substantially equal while the remaining apex angles vary.

In one embodiment of the first aspect of the invention, the two edge lines of the cross-section are substantially equal (i.e., isosceles triangular cross-section) for all grooves. In another embodiment, the two edge lines are substantially equal for some of the grooves and the two edge lines are not equal for the remaining grooves. In a further embodiment, the two edge lines are different for all grooves.

In one embodiment, the apex angles have no more than five different sizes throughout the structure.

In one embodiment of the first aspect of the invention, the heights "h" of the grooves are substantially equal throughout the structure. In another embodiment, the heights of the grooves vary.

In one embodiment of the first aspect of the invention, the pitches ("p") of the grooves are substantially equal for all grooves throughout the structure. In another embodiment, the pitches ("p") of the grooves vary.

In any case, the grooves of different apex angles are randomly located in the luminance enhancement structure.

The luminance enhancement resulted from different apex angles as described as the first aspect of the invention may be similarly achieved by maintaining the apex angles substantially equal while varying the angles of the edge lines of the grooves. This constitutes the second aspect of the present invention as shown in FIGS. 3c-3i. In this aspect of the invention, the edge lines of the cross section (301) may comprise two or more segments of straight line and the different segments of the straight line have different edge line angles (expressed as ELA in the drawings). The term "edge line angle" is referred to the angle of a segment of the straight line from the normal axis.

In this type of design, the apex angles may be maintained substantially equal for all grooves throughout the structure. In one embodiment, the apex angles may vary; however, it is not needed.

Figure 3C:
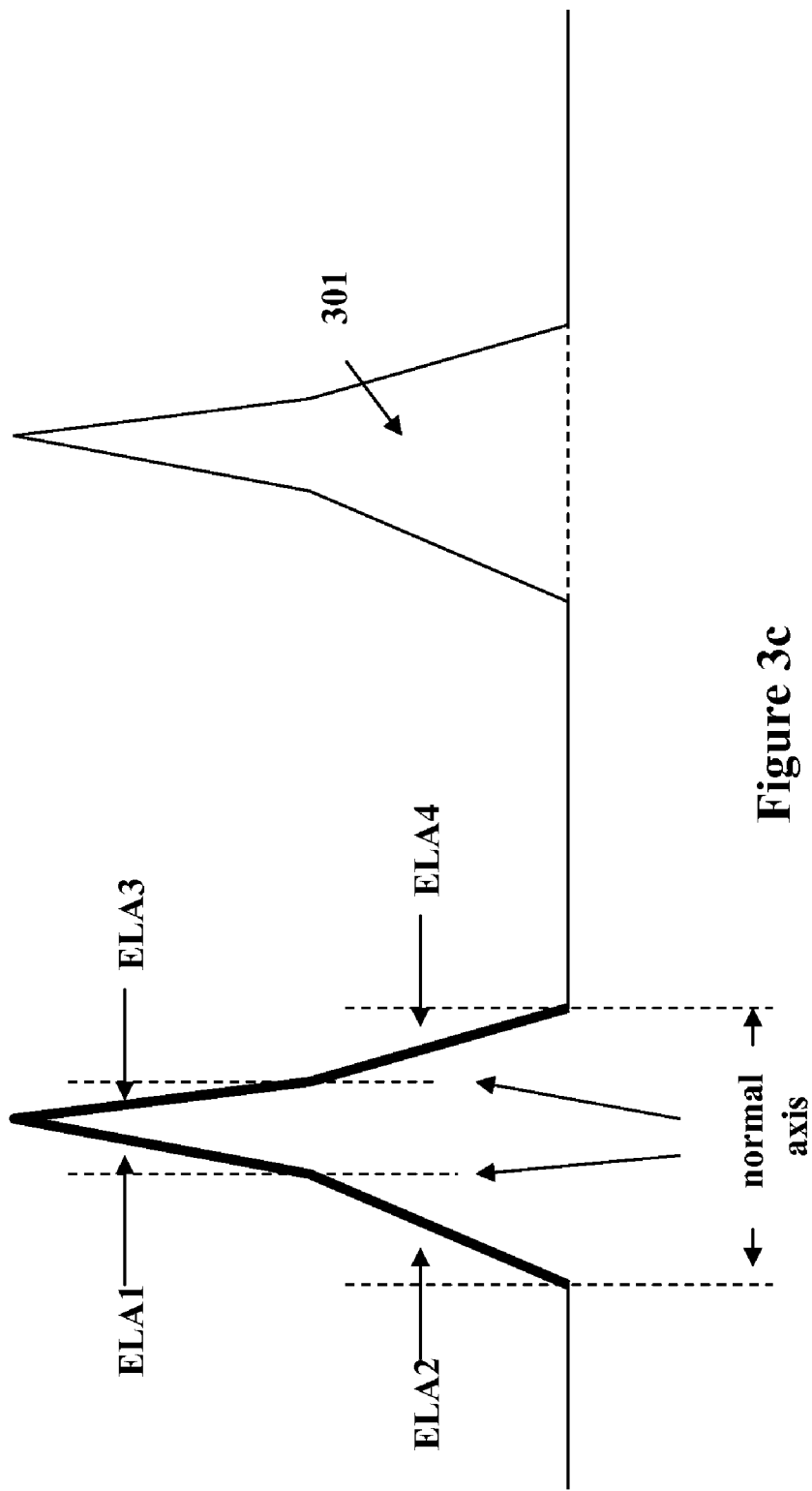
Figure 3F:
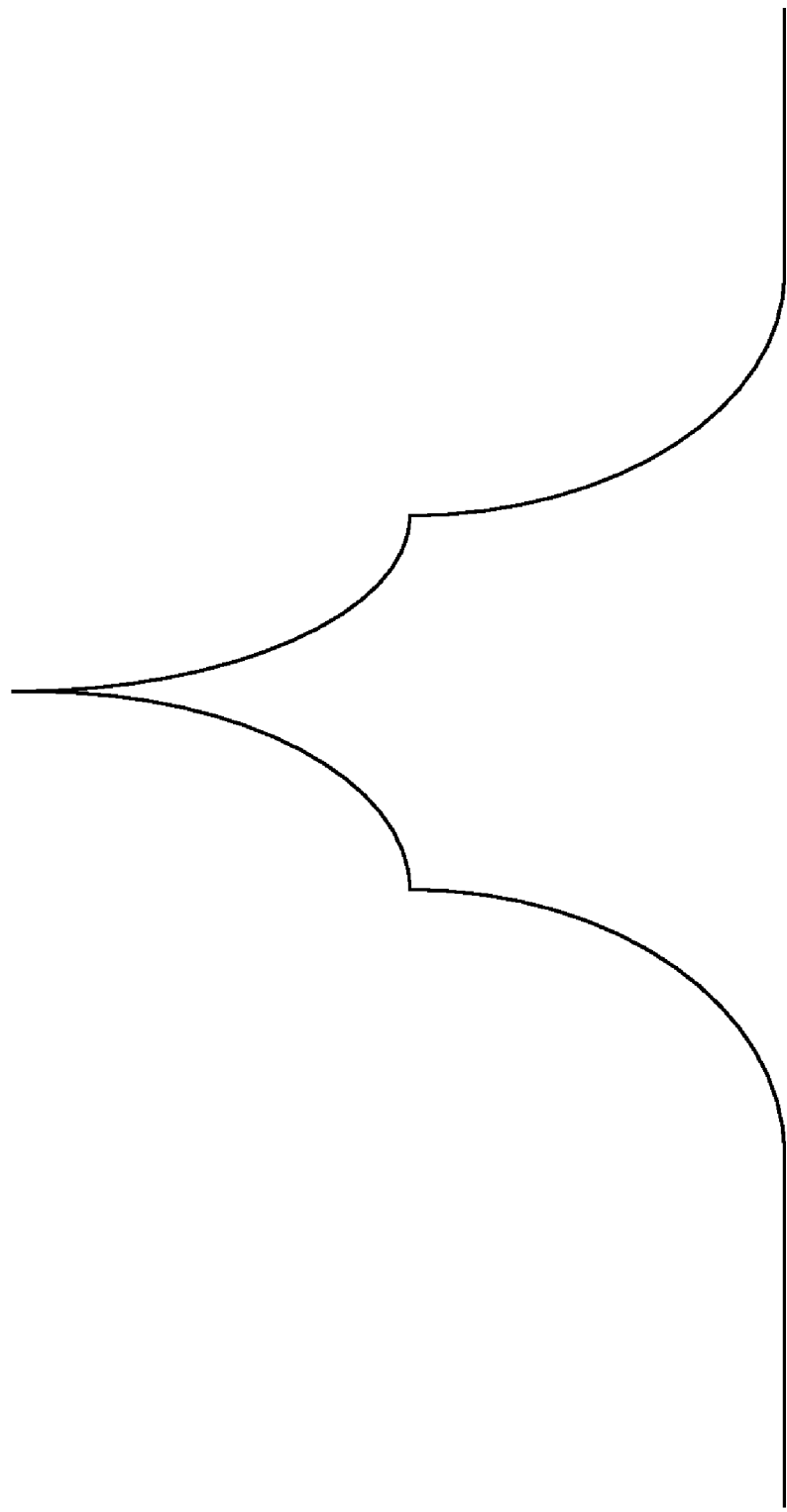

In FIG. 3c, each edge line is formed of two segments of straight line whereby ELA1 is not equal to ELA2 and ELA3 is not equal to ELA4. In FIG. 3d, each edge line is formed of four segments of the straight line and the edge line angles of the four segments of the straight line are all different.

It is noted that while the number of the segments increases, the edge lines would appear to be curved as shown in FIG. 3e. It is also understood that the curved line may consist of more than one curvature (see FIG. 3f), depending on how the segments of the straight line are connected.

Figure 3H:
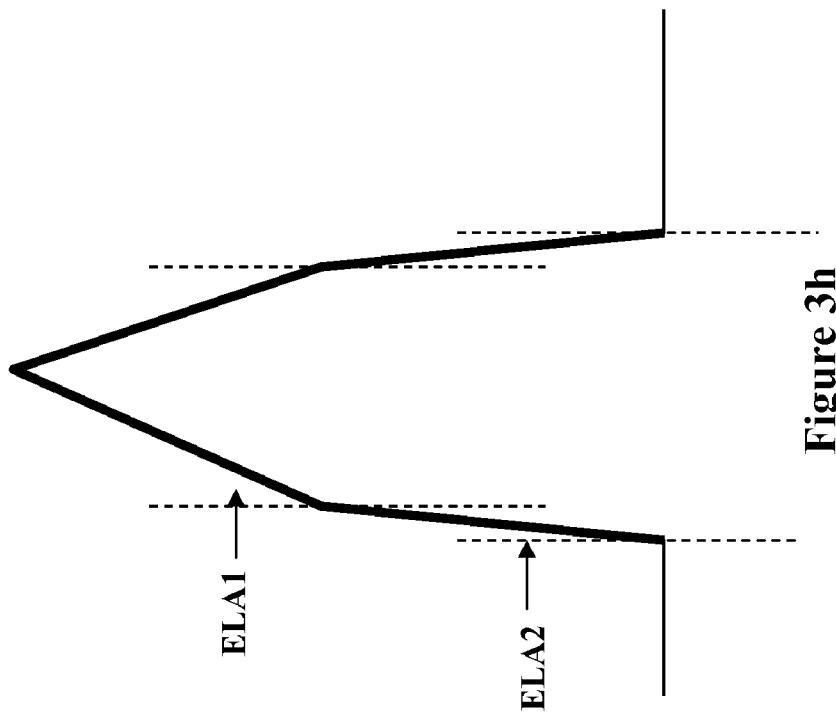
Figure 3G:
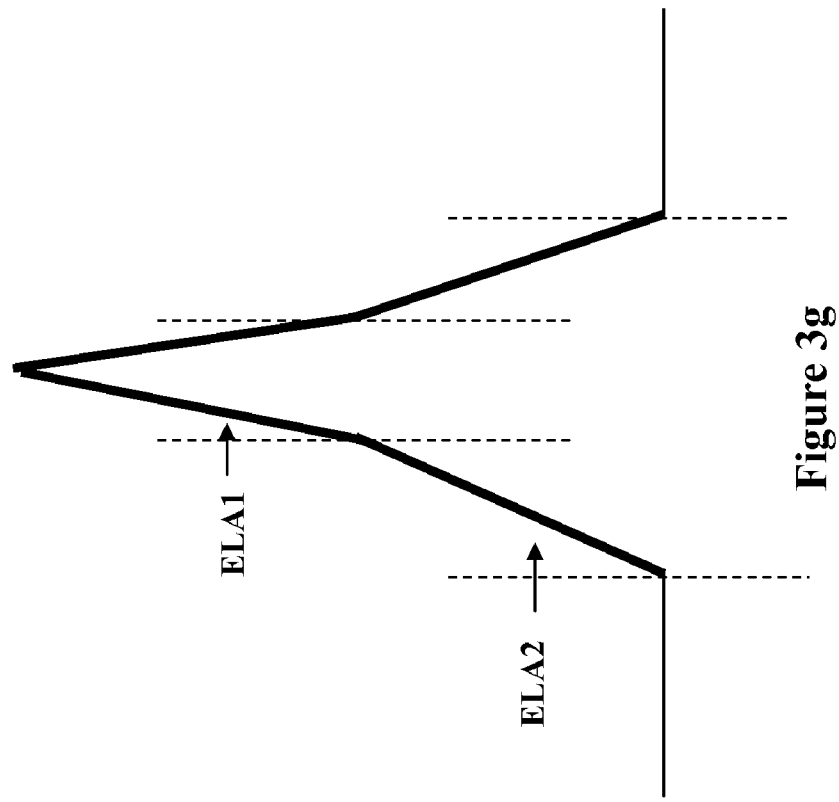

In FIG. 3g, ELA2 is greater than ELA1. In FIG. 3h, ELA1 is greater than ELA2.

Figure 3I:
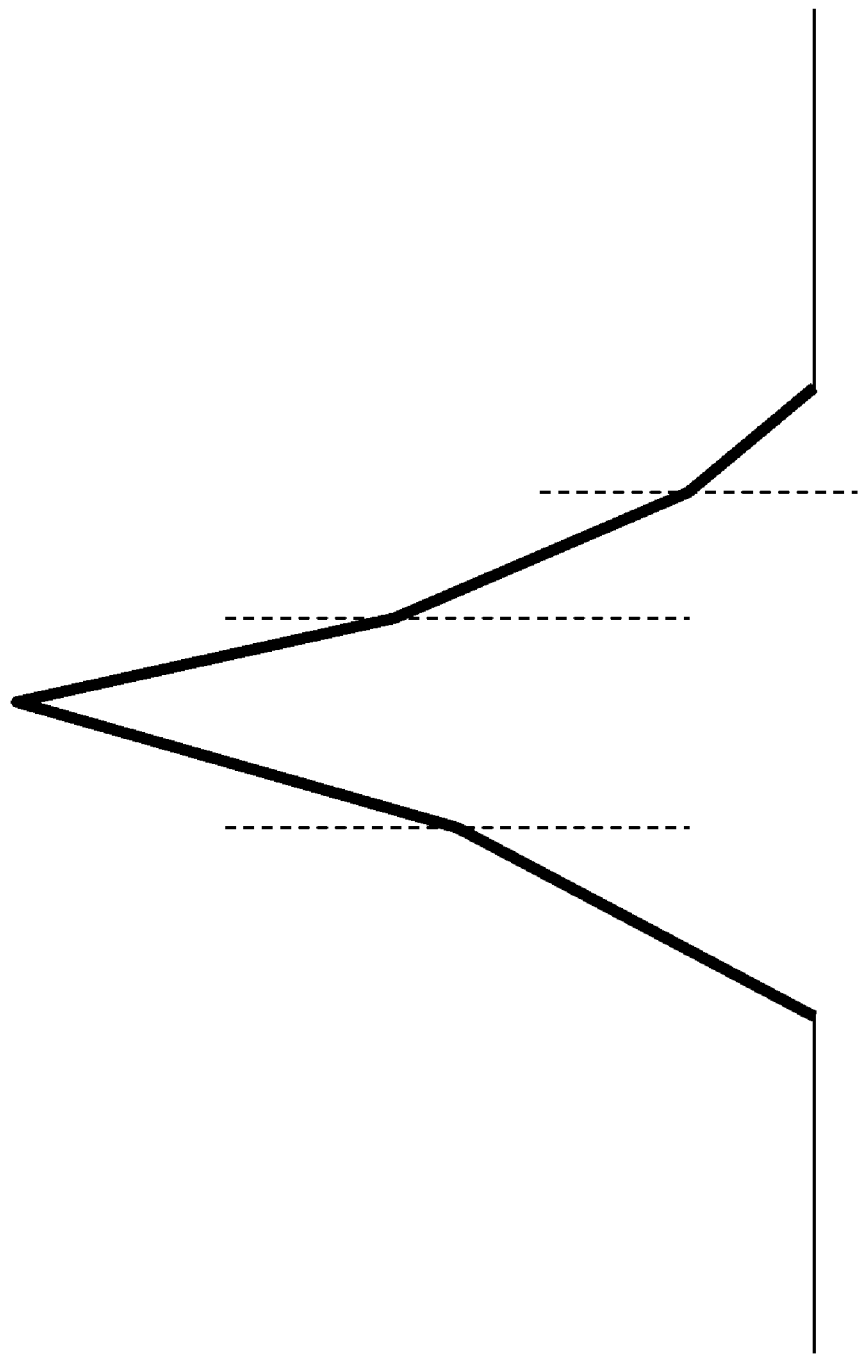

In one embodiment of the second aspect of the invention, the two edge lines of a single groove may have different numbers of segments of straight line. For example, as shown in FIG. 3i, one of the edge lines of a groove is formed of two segments of straight line while the other edge line is formed of three segments of straight line.

In one embodiment, all grooves have the same set of two edge lines.

Regardless of the configurations, the size of the apex angles throughout this application, is preferably within a certain range in order for the luminance enhancement structure to be effective, which is illustrated below.

In addition, in both the first and second aspects of the invention, the luminance enhancement structure may be one dimensional (FIG. 2b) or two dimensional (FIG. 2c). However, it is preferable that the structure is one dimensional.

Unless otherwise stated, the term "substantially equal" or "substantially the same" is intended to refer to the fact that the variances for the angles or distances are within the range of manufacturing tolerances.

IV. Display Device with the Luminance Enhancement Structure

Figure 4:
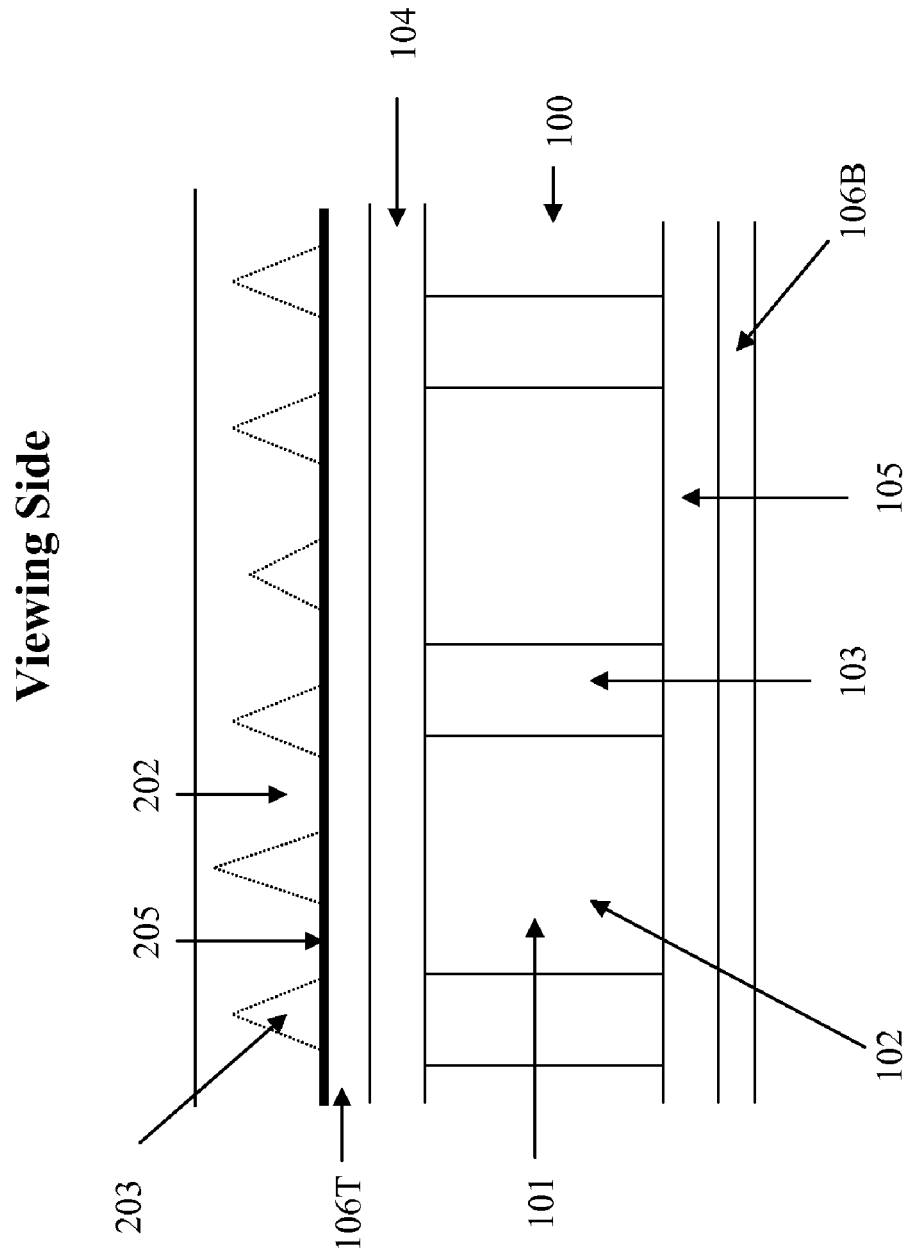
FIG. 4 is a cross-section view of a luminance enhancement structure of the present invention on the viewing side of a display device.

FIG. 4 depicts a cross-section view of the luminance enhancement structure on the viewing side of the display device. As shown, the luminance enhancement structure of FIG. 2a has been turned 180°, with the top surface (205) of the columns (202) now in optical contact with the top substrate layer (106T) of the display device, which means that there is no air gap between the top surface 205 and the substrate layer 106T. This may be achieved by an adhesive material, such as the Norland® optical adhesive.

The space within the grooves (203) usually is filled with air. It is also possible for the space to be in a vacuum state. Alternatively, the space in the grooves (203) may be filled with a low refractive index material, lower than the refractive index of the material forming the luminance enhancement structure.

The thickness of the top substrate layer (106T) is usually between about 5 µm to about 175 µm, more preferably between about 1 µm to about 50 µm. In order to achieve the effect of the luminance enhancement structure, the top substrate layer is preferably as thin as possible (e.g., about 1 µm to about 25µ). During formation of a display cell layer on the substrate layer, preferably the substrate layer is adhered to a base layer for mechanical strength and the display cells are formed on the side of the substrate layer. After the display cells are formed, the base layer is removed and a luminance enhancement structure is laminated (optionally with an adhesive layer) to the substrate layer to complete the assembly.

Figure 5:
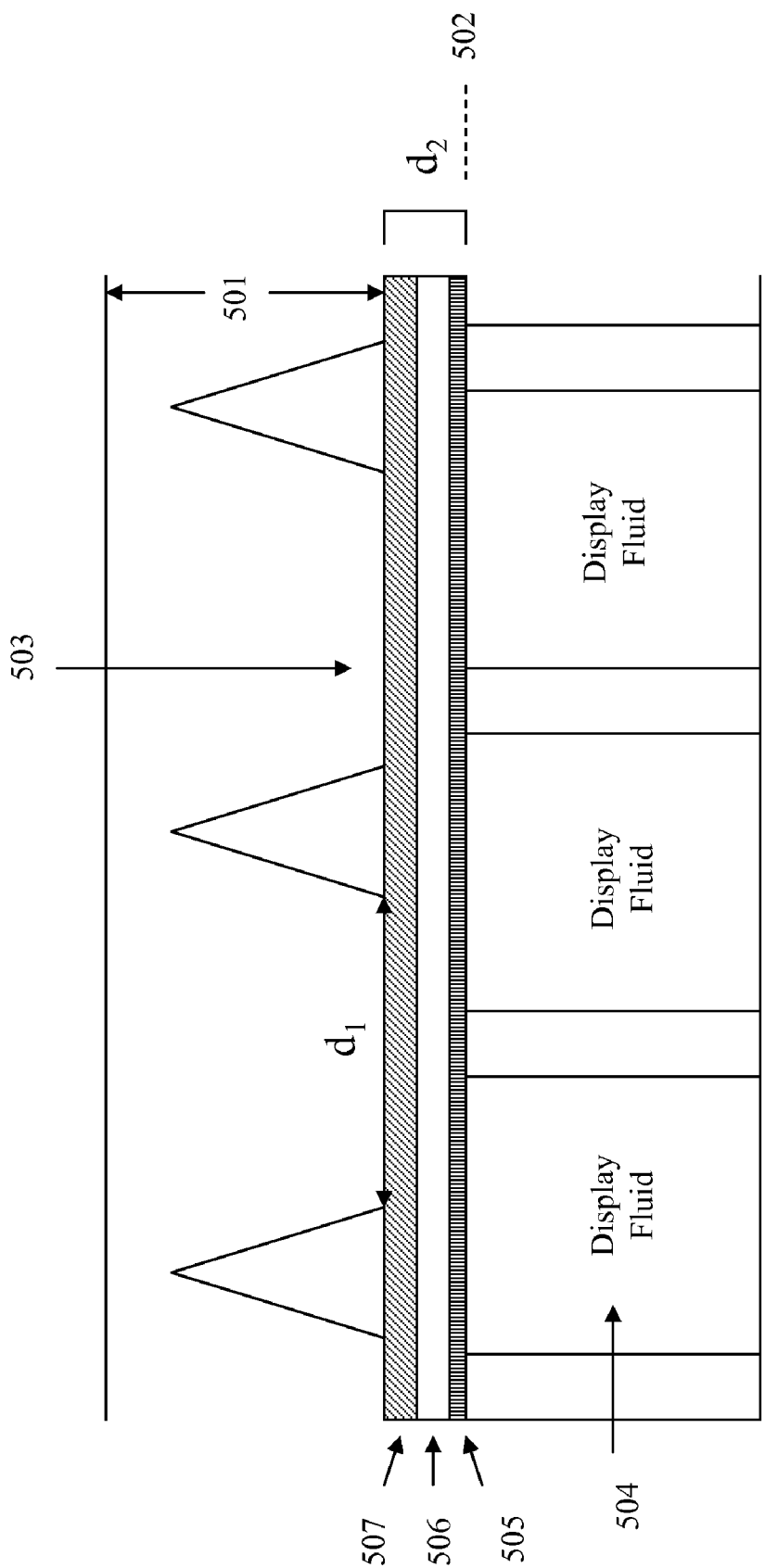
FIG. 5 depicts an embodiment of the present invention which comprises a display device and a luminance enhancement structure on the viewing side of the display device.

FIG. 5 shows an embodiment of the assembly comprising a display device and a luminance enhancement structure (501) on the viewing side of the display device comprising display cells (504). In this embodiment, the ratio of the width ($d_1$) of the top surface of the columns (503) to the distance ($d_2$) between the luminance enhancement structure (501) and the top (502) of the display fluid is at least about 2. It is noted that the distance $d_2$ may comprise an electrode layer (505), the substrate layer (506) and optionally an adhesive layer (507).

V. Dimensions of the Luminance Enhancement Structure

Figure 6A:
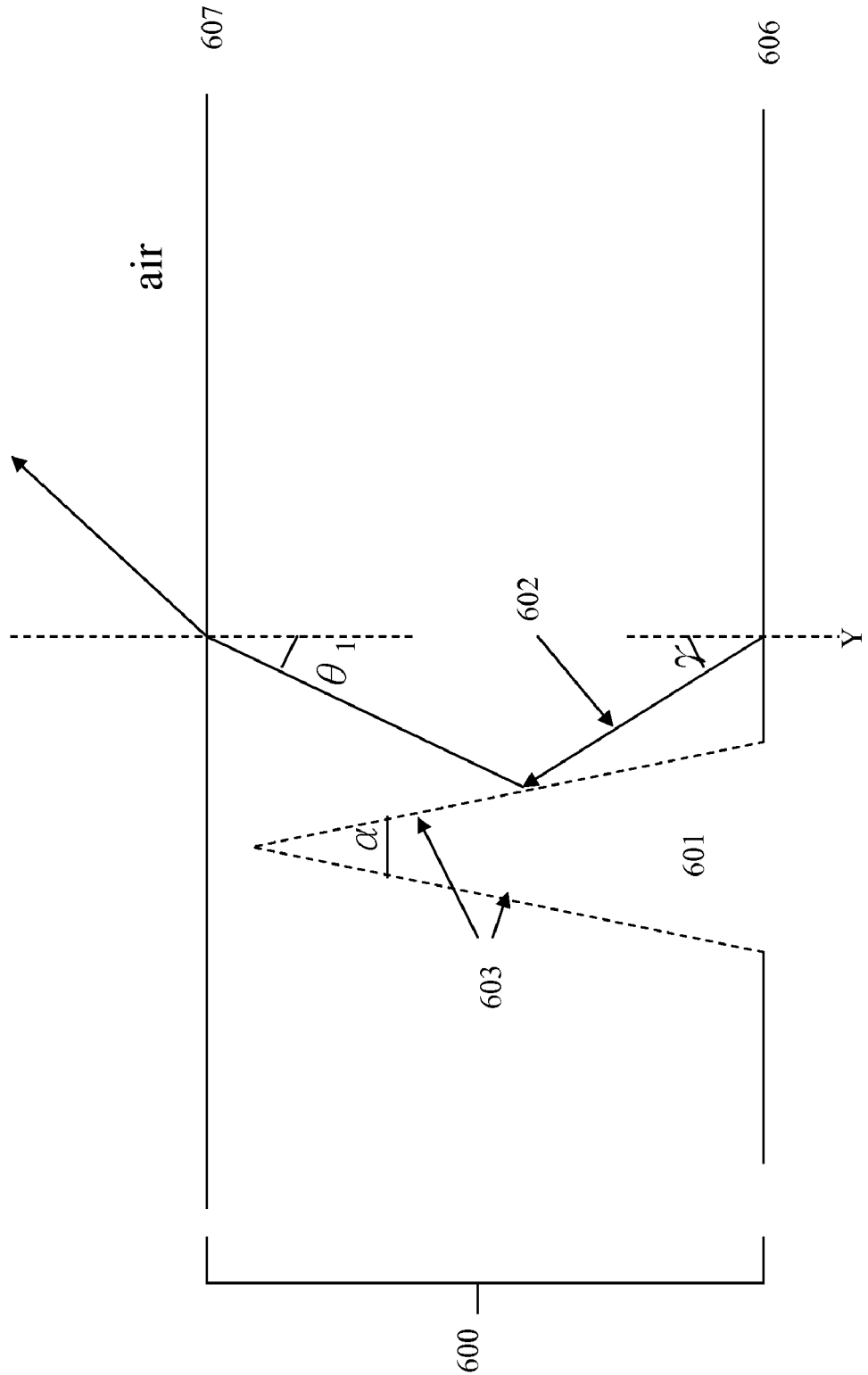
FIGS. 6a-6b illustrate the dimensions of a luminance enhancement structure.
Figure 6B:
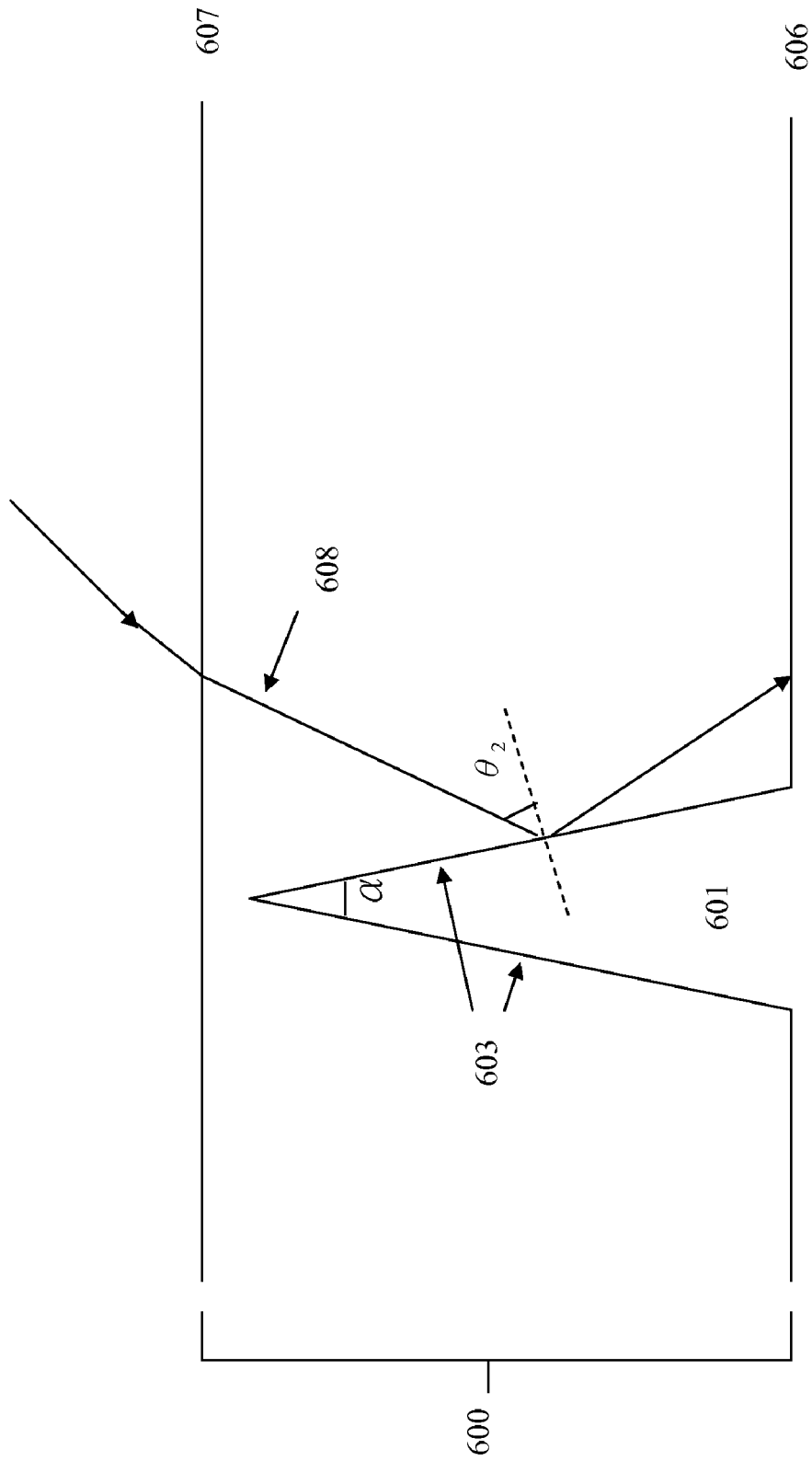

FIGS. 6a-6b illustrate the dimensions of a luminance enhancement structure of the present invention and show how the luminance enhancement structure may enhancement brightness.

In FIG. 6a, it is shown that the design aims to ensure an angle of incidence $\theta_1$ to be smaller than the critical angle $C_1$ (not shown) at the boundary between the top surface (607) of the luminance enhancement structure (600) and air.

The critical angle $C_1$, in this case, is about 42° based on the refractive index of the material for the luminance enhancement structure being 1.5 and the refractive index of air surrounding the top surface of the luminance enhancement structure being 1.

As shown in FIG. 6a, the light (602) scattered from the pigment particles through the top surface (606) of the display device is reflected at the tilted surface (603) of the groove (601) and reaches the top surface (607) of the luminance enhancement structure (600). In order for the angle of incidence ($\theta_1$) at the top surface of the luminance enhancement structure to be smaller than 42°, the top angle α of the groove (601) is preferably in the range of 5 to 50°, more preferably in the range of from about 20° to about 40°. As a result, the angle of incidence $\theta_1$ will be smaller than the angle γ, which reduces the chance of total internal reflection at the top surface and increases the overall optical efficiency. The angle γ is an angle at the intersection of the light (602) and the normal axis (marked Y) of the surface (606) of the display device.

An incoming light (not shown) from a light source transmits through the luminance enhancement structure and strikes the display device and is then reflected with a scattering profile. The scattered light 602 in FIG. 6a is a typical example of such a reflected light.

FIG. 6b demonstrates that the tilted surface (603) of the groove (601) will reflect incoming light by total internal reflection. The design aims to ensure that the light striking the tilted surface (603) of the groove (601) will be reflected instead of transmitting through the space within the groove. The critical angle $C_2$ (not shown) at the boundary between the tilted surface (603) and the space within the groove may be calculated based on the refractive index of the material for the luminance enhancement structure and the refractive index of what is filled in the space of the groove (601). If the groove is unfilled, the refractive index of air is about 1. With the refractive index of the material for the luminance enhancement structure being about 1.5, the critical angle $C_2$ would be about 42°. When the angle of incidence $\theta_2$ of the light (608) coming from the surface (607) is greater than 42°, the light striking the tilted surface (603) will be totally internal reflected towards the boundary 606 which is desired in this case because otherwise, the light would transmit through the space in the groove.

A reflective tilted surface may be achieved by coating a metal layer over the surface of the groove. However, in one embodiment of the present invention, the surface of the grooves is preferably uncoated.

Since the light striking the tilted surface will be reflected as discussed above, the off-axis light may move toward the on-axis direction. In other words, the display device with a luminance enhancement structure of the present invention will be brighter at the on-axis angles by both reducing total internal reflection and utilizing the off-axis light.

However, the luminance enhancement structure is also sensitive to the direction of the light sources. The more light that comes from a greater angle of incidence, the worse the enhancement performance is. Furthermore, the luminance enhancement performance is at the maximum when all of the light sources are at an angle of incidence of 0°.

Although in most cases the direction of light sources cannot be controlled for a display device, generally any light sources coming from above the display device (such as from a ceiling) would provide the desired luminance conditions.

VI. Fabrication of the Luminance Enhancement Structure

The luminance enhancement structure may be fabricated in many different ways.

Figure 7A:
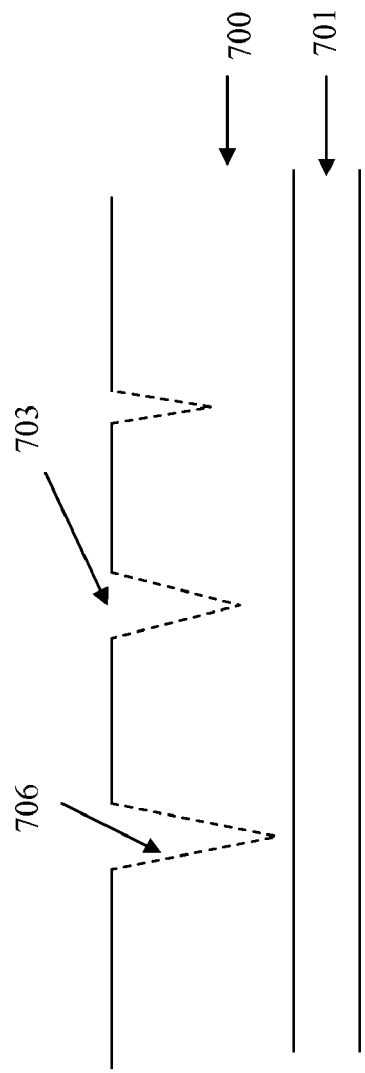

In one embodiment, the luminance enhancement structure may be fabricated separately and then laminated over the viewing side of the display device. For example, the luminance enhancement structure may be fabricated by embossing as shown in FIG. 7a. The embossing process is carried out at a temperature higher than the glass transition temperature of the embossable composition (700) coated on a substrate layer (701). The embossing is usually accomplished by a mold which may be in the form of a roller, plate or belt. The embossable composition may comprise a thermoplastic, thermoset or a precursor thereof. More specifically, the embossable composition may comprise multifunctional acrylate or methacrylate, multifunctional vinylether, multifunctional epoxide or an oligomer or polymer thereof. The glass transition temperatures (or Tg) for this class of materials usually range from about −70° C. to about 150° C., preferably from about −20° C. to about 50° C. The embossing process is typically carried out at a temperature higher than the Tg. A heated mold or a heated housing substrate against which the mold presses may be used to control the embossing temperature and pressure. The mold is usually formed of a metal such as nickel. The hardening of the embossable composition may be accomplished by cooling, solvent evaporation, cross-linking by radiation, heat or moisture.

The mold is preferably manufactured by the diamond turning technique. Typically the mold is made by diamond turning technique on a cylindrical blank known as a roll. The surface of the roll is typically of hard copper, although other materials may be used. The pattern on the mold (roll) is the opposite of the intended luminance enhancement structure. In other words, the roll will show sharp protruding patterns which are corresponding to the grooves of the luminance enhancement structure. The pattern on the roll is formed in a continuous manner around the circumference of the roll. In a preferred embodiment, the indentations on the surface of the roll are produced by a technique known as thread cutting. In thread cutting, a single, continuous indentation is cut on the roll while the diamond cutter is moved in a direction transverse to the turning roll. If the mold to be produced has a constant pitch, during manufacture of the mold, the roll will move at a constant velocity. A typical diamond turning machine will provide independent control of the depth that the cutter penetrates the roll, the horizontal and vertical angles that the cutter makes to the roll and the transverse velocity of the cutter.

As shown in FIG. 7a, the mold creates the grooves (703) and is released during or after the embossable composition is hardened.

The hardening of the embossable composition may be accomplished by cooling, solvent evaporation, cross-linking by radiation, heat or moisture.

The refraction index of the material for forming the luminance enhancement structure is preferably greater than about 1.4, more preferably between about 1.5 and about 1.7.

The luminance enhancement structure may be used as is or further coated with a metal layer.

Figure 7B:
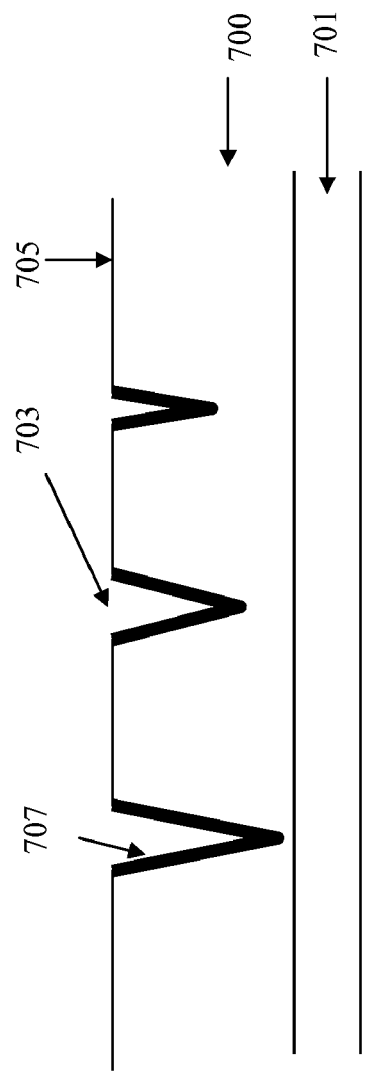

The metal layer (707) is then deposited over the surface (706) of the grooves (703) as shown in FIG. 7b. Suitable metals for this step may include, but are not limited to, aluminum, copper, zinc, tin, molybdenum, nickel, chromium, silver, gold, iron, indium, thallium, titanium, tantalum, tungsten, rhodium, palladium, platinum and cobalt. Aluminum is usually preferred. The metal material must be reflective, and it may be deposited on the surface (706) of the grooves, using a variety of techniques such as sputtering, evaporation, roll transfer coating, electroless plating or the like.

Figure 7C:
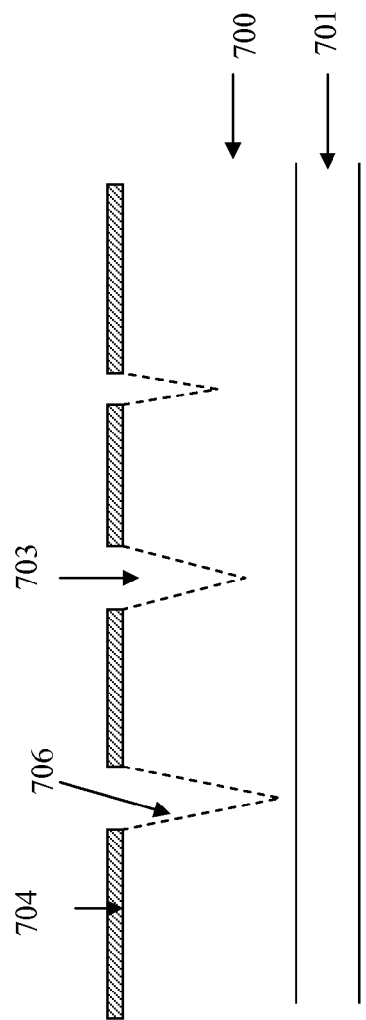

In order to facilitate formation of the metal layer only on the intended surface (i.e., the surface 706 of the grooves), a strippable masking layer may be coated before metal deposition, over the surface on which the metal layer is not to be deposited. As shown in FIG. 7c, a strippable masking layer (704) is coated onto the surface (705) between the openings of the grooves. The strippable masking layer is not coated on the surface (706) of the grooves.

The coating of the strippable masking layer may be accomplished by a printing technique, such as flexographic printing, driographic printing, electrophotographic printing, lithographic printing, gravure printing, thermal printing, inkjet printing or screen printing. The coating may also be accomplished by a transfer-coating technique involving the use of a release layer. The strippable masking layer preferably has a thickness in the range of about 0.01 to about 20 microns, more preferably about 1 to about 10 microns.

For ease of stripping, the layer is preferably formed from a water-soluble or water-dispersible material. Organic materials may also be used. For example, the strippable masking layer may be formed from a re-dispersible particulate material. The advantage of the re-dispersible particulate material is that the coated layer may be easily removed without using a solubility enhancer. The term "re-dispersible particulate" is derived from the observation that the presence of particles in the material in a significant quantity will not decrease the stripping ability of a dried coating and, on the contrary, their presence actually enhances the stripping speed of the coated layer.

The re-dispersible particulate consists of particles that are surface treated to be hydrophilic through anionic, cationic or non-ionic functionalities. Their sizes are in microns, preferably in the range of about 0.1 to about 15 um and more preferably in the range of about 0.3 to about 8 um. Particles in these size ranges have been found to create proper surface roughness on a coated layer having a thickness of <15 um. The re-dispersible particulate may have a surface area in the range of about 50 to about 500 m$^2$/g, preferably in the range of about 200 to about 400 m$^2$/g. The interior of the re-dispersible particulate may also be modified to have a pore volume in the range of about 0.3 to about 3.0 ml/g, preferably in the range of about 0.7 to about 2.0 ml/g.

Commercially available re-dispersible particulates may include, but are not limited to, micronized silica particles, such as those of the Sylojet series or Syloid series from Grace Davison, Columbia, Md., USA.

Non-porous nano sized water re-dispersible colloid silica particles, such as LUDOX AM can also be used together with the micron sized particles to enhance both the surface hardness and stripping rate of the coated layer.

Other organic and inorganic particles, with sufficient hydrophilicity through surface treatment, may also be suitable. The surface modification can be achieved by inorganic and organic surface modification. The surface treatment provides the dispensability of the particles in water and the re-wettability in the coated layer.

Figure 7D:
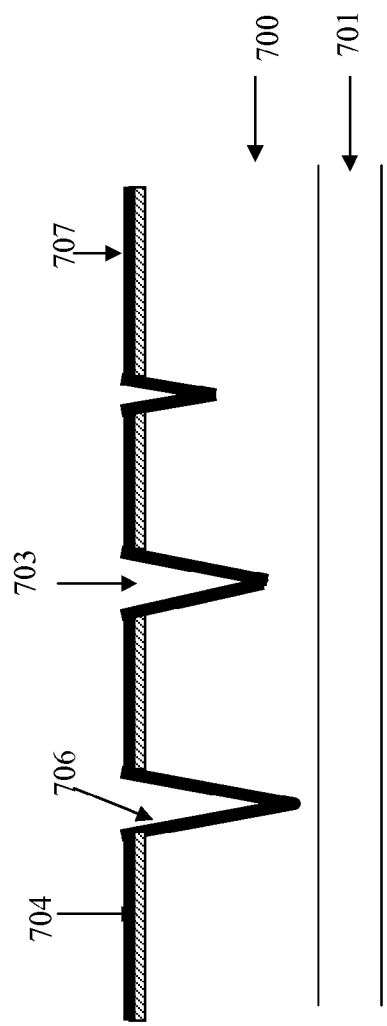

In FIG. 7d, a metal layer (707) is shown to be deposited over the entire surface, including the surface (706) of the grooves and the surface (705) between the grooves. Suitable metal materials are those as described above. The metal material must be reflective and may be deposited by a variety of techniques previously described.

Figure 7E:
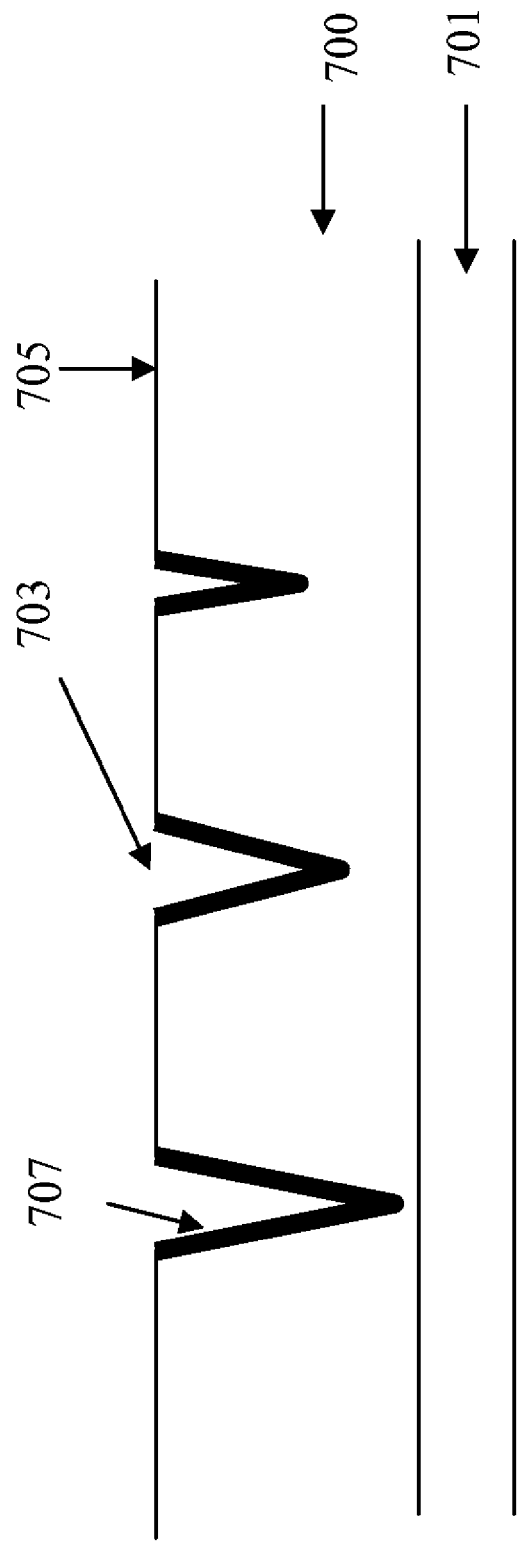

FIG. 7e shows the structure after removal of the strippable masking layer (704) with the metal layer (707) coated thereon. This step may be carried out with an aqueous or non-aqueous solvent such as water, MEK, acetone, ethanol or isopropanol or the like, depending on the material used for the strippable masking layer. The strippable masking layer may also be removed by mechanical means, such as brushing, using a spray nozzle or peeling it off with an adhesive layer. While removing the strippable masking layer (704), the metal layer (707) deposited on the strippable masking layer is also removed, leaving the metal layer (707) only on the surface (706) of the grooves.

FIGS. 7f and 7g depict an alternative process for depositing the metal layer. In FIG. 7f, a metal layer (707) is deposited over the entire surface first, including both the surface (706) of the grooves and the surface (705) between the grooves. FIG. 7g shows that the film of grooves deposited with a metal layer (707) is laminated with a film (717) coated with an adhesive layer (716). The metal layer (707) on top of the surface (705) may be conveniently peeled off when the film of grooves is delaminated (separated) from the adhesive layer (716) coated film (717). The thickness of the adhesive layer (716) on the adhesive coated film is preferably in the range of about 1 to about 50 um and more preferably in the range of about 2 to about 10 um.

The luminance enhancement structure comprising grooves (uncoated or coated with a metal layer) is then laminated over a layer of display cells as described above.

For a two dimensional luminance enhancement structure, it may be manufactured by a self-aligned process as disclosed in U.S. application Ser. No. 12/323,300, filed Nov. 25, 2008, the content of which is incorporated herein by reference in its entirety. In the self-aligned process, the display cells are formed by a photolithography process, utilizing the luminance enhancement structure as a photomask.

While the present invention has been described with reference to the specific embodiments thereof, it should be understood by those skilled in the art that various changes may be made and equivalents may be substituted without departing from the true spirit and scope of the invention. In addition, many modifications may be made to adapt a particular situation, materials, compositions, processes, process step or steps, to the objective, spirit and scope of the present invention. All such modifications are intended to be within the scope of the claims appended hereto.

What is claimed is:

1. A display device assembly comprising
 a) a display panel which comprises an array of display cells filled with a display fluid; and
 b) a one-dimensional luminance enhancement structure comprising columns and grooves, wherein each of said grooves has a cross-section comprising an apex angle in the range of about 5-50° and two edge lines, and said columns and grooves are in an alternating order and in a continuous form in one direction,
 wherein the luminance enhancement structure is on the viewing side of the display device to allow incoming light from a light source to transmit through the luminance enhancement structure and strike the display panel and then to be reflected from the luminance enhancement structure.

2. The assembly of claim 1, wherein said two edge lines are straight lines and the apex angles of the grooves are not the same throughout the structure.

3. The assembly of claim 2, wherein the two edge lines of the cross-section are substantially equal for all grooves.

4. The assembly of claim 2, wherein the two edge lines are substantially equal for some of the grooves and the two edge lines are not equal for the remaining grooves.

5. The assembly of claim 2, wherein the two edge lines are not equal for all grooves.

6. The assembly of claim 2, wherein the heights of the grooves are substantially equal throughout the structure.

7. The assembly of claim 2, wherein the heights of the grooves vary.

8. The assembly of claim 2, wherein the pitches of the grooves are substantially equal for all grooves throughout the structure.

9. The assembly of claim 2, wherein the pitches of the grooves vary.

10. The assembly of claim 1, wherein each of the two edge lines comprise two or more segments of straight line and the different segments of the straight line have different edge line angles.

11. The assembly of claim 10, wherein the apex angles of the grooves are substantially equal for all grooves throughout the structure.

12. The assembly of claim 10, wherein the edge lines appear curved.

13. The assembly of claim 10, wherein the curved edge lines have more than one curvature.

14. The assembly of claim 1, wherein the two edge lines of a single groove have different numbers of segments of the straight line.

15. The assembly of claim 1, wherein said apex angle is in the range of about 20° to about 40°.

16. The assembly of claim 1, wherein the surface of the grooves is not coated.

* * * * *